US011023846B2

(12) United States Patent
Gillen et al.

(10) Patent No.: US 11,023,846 B2
(45) Date of Patent: Jun. 1, 2021

(54) LOCATION-BASED PICK UP AND DELIVERY SERVICES

(71) Applicant: United Parcel Service of America, Inc., Atlanta, GA (US)

(72) Inventors: Robert J. Gillen, Alpharetta, GA (US); David Sisco, Atlanta, GA (US); Sara Zoromsky, Atlanta, GA (US); Jeff Enyart, Alpharetta, GA (US); Kalin Robinson, Alpharetta, GA (US); David Carder, Cumming, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 656 days.

(21) Appl. No.: 15/130,311

(22) Filed: Apr. 15, 2016

(65) Prior Publication Data

US 2016/0314429 A1 Oct. 27, 2016

Related U.S. Application Data

(60) Provisional application No. 62/152,155, filed on Apr. 24, 2015.

(51) Int. Cl.
*G06Q 10/08* (2012.01)
*G01S 19/13* (2010.01)
(Continued)

(52) U.S. Cl.
CPC ........... *G06Q 10/083* (2013.01); *G01S 19/13* (2013.01); *G06Q 10/0631* (2013.01); *G06Q 10/0833* (2013.01); *G06Q 50/28* (2013.01)

(58) Field of Classification Search
CPC ............ G06Q 10/083; G06Q 10/0631; G06Q 10/0833; G06Q 50/28; G01S 19/13
See application file for complete search history.

(56) References Cited

U.S. PATENT DOCUMENTS 6,618,668 B1 9/2003 Laird
6,975,941 B1 12/2005 Lau et al.
(Continued)

FOREIGN PATENT DOCUMENTS

CN 102708475 A 10/2012
CN 102843644 A 12/2012
(Continued)

OTHER PUBLICATIONS

Kessler, Sarah; "UPS Will Text You Before Your Package Is Delivered," Sep. 14, 2011, Mashable, retrieved from https://mashable.com/2011/09/14/ups_my_choice/ (Year: 2011).*
(Continued)

*Primary Examiner* — John P Go
*Assistant Examiner* — Bryan J Kirk
(74) *Attorney, Agent, or Firm* — Shook, Hardy and Bacon, L.L.P.

(57) ABSTRACT

Computer program products, methods, systems, apparatus, and computing entities are provided. In one embodiment, a method is provided. The method comprises receiving location information for an item. The location information indicates the current physical location of the item. The method further comprises determining whether the item is located within a first configurable distance of an establishment and responsive to determining that the item is located within the first configurable distance of the establishment, requesting first location information for the consignee of the item and second location information for the consignee of the item. The method further comprises determining whether the consignee is within a second configurable distance of the establishment based at least in part on the first location information for the consignee and the second location information for the consignee and providing a notifi-
(Continued)

cation for display via a user interface of an application executing on a customer computing entity.

19 Claims, 24 Drawing Sheets

(51) Int. Cl.
*G06Q 10/06* (2012.01)
*G06Q 50/28* (2012.01)

(56) References Cited

U.S. PATENT DOCUMENTS

| | | | |
|---|---|---|---|
| 7,212,829 B1 | 5/2007 | Lau et al. | |
| 7,647,231 B2 | 1/2010 | Kuebert et al. | |
| 7,693,745 B1 | 4/2010 | Pomerantz et al. | |
| 8,015,023 B1 | 9/2011 | Lee et al. | |
| 8,179,238 B2 | 5/2012 | Roberts, Sr. et al. | |
| 8,215,546 B2 | 7/2012 | Lin et al. | |
| 9,082,096 B2 | 7/2015 | Parameswaran et al. | |
| 2001/0042055 A1 | 11/2001 | Didriksen et al. | |
| 2002/0016171 A1 | 2/2002 | Doganata et al. | |
| 2002/0103653 A1 | 8/2002 | Huxter | |
| 2004/0236635 A1 | 11/2004 | Publicover | |
| 2007/0052586 A1 | 3/2007 | Horstemeyer | |
| 2007/0083410 A1 | 4/2007 | Hanna | |
| 2009/0012802 A1 | 1/2009 | Pinney | |
| 2010/0014676 A1 | 1/2010 | Mccarthy et al. | |
| 2011/0202427 A1 | 8/2011 | Garcia Jurado Suarez et al. | |
| 2011/0238300 A1 | 9/2011 | Schenken | |
| 2012/0030133 A1* | 2/2012 | Rademaker | G06Q 10/08 705/333 |
| 2013/0103606 A1 | 4/2013 | Holliday | |
| 2014/0052661 A1* | 2/2014 | Shakes | G06Q 10/0836 705/339 |
| 2014/0180959 A1 | 6/2014 | Gillen et al. | |
| 2014/0195456 A1* | 7/2014 | Horstemeyer | B60R 25/102 705/333 |
| 2014/0222711 A1 | 8/2014 | Tibbs et al. | |
| 2014/0266669 A1 | 9/2014 | Fadell et al. | |
| 2014/0279648 A1 | 9/2014 | Whitehouse | |
| 2015/0088652 A1 | 3/2015 | Finley et al. | |
| 2015/0112919 A1* | 4/2015 | Weir | G01C 21/3476 706/52 |
| 2015/0120602 A1 | 4/2015 | Huffman et al. | |
| 2015/0199643 A1* | 7/2015 | Hubner | G06Q 50/32 705/333 |
| 2015/0241565 A1 | 8/2015 | Chavez et al. | |
| 2015/0348004 A1* | 12/2015 | Eramian | G06Q 20/3224 705/40 |
| 2016/0316322 A1 | 10/2016 | Gillen | |
| 2016/0320525 A1* | 11/2016 | Brigham | G06Q 30/02 |
| 2017/0262798 A1 | 9/2017 | Kosseifi et al. | |
| 2019/0141468 A1 | 5/2019 | Gillen | |

FOREIGN PATENT DOCUMENTS

| | | |
|---|---|---|
| WO | WO 2014/033559 A1 | 3/2014 |
| WO | WO 2015/002667 A1 | 1/2015 |

OTHER PUBLICATIONS

Lou, Zhe, "NFC Enabled Smart Postal System", 2010 Second International Workshop on Near Field Communication, Apr. 2010, pp. 33-38, IEEE, U.S.A.
Unknown Author, "Australia Post Develops Wearable Parcel Delivery App", Austria Post Newsroom, Apr. 24, 2015, 1 page retrieved from <https://auspost.newsroom.com.au/Content/Default/01-News-Releases/Article/Australia-Post-develops-wearable-parcel-delivery-app/-3/27/6031> on Sep. 21, 2016.
Wang, Bin, et al., "An Efficient Self-Service Pre-Payment Courier System on Mobile NFC Technology", International Journal of U- and E-Service, Science and Technology, 2015, vol. 8, No. 4, pp. 103-112, SERSC, Korea.
International Examining Authority, Written Opinion (second) for International Application No. PCT/IB2016/052317, dated Mar. 16, 2017, 8 pages, European Patent Office, Germany.
Bennyblogger, "Imminent Delivery Notification", *Your Postal Blog*, Sep. 19, 2013, 4 pages, retrieved from <https://yourpostalblog.wordpress.com/2013/09/19/imminent-delivery-notification> on Jul. 18, 2016.
DPD Group, "Follow My Parcel", retrieved from <http://www.dpd.co.uk/content/products_services/followmyparcel.jsp> on Jul. 18, 2016, 3 pages.
International Searching Authority, International Search Report and Written Opinion for International Application No. PCT/IB2016/052317, dated Jun. 17, 2016, 11 pages, European Patent Office, the Netherlands.
Namiot, D., et al., "Geofence and Network Proximity", Internet of Things, Smart Spaces, and Next Generation Networking, 2013, 6 pages, Springer, Germany retrieved from <http://arxiv.org/ftp/arxiv/papers/1303/1303.5943.pdf> on Jul. 13, 2016.
Steinfield, Charles, "The Development of Location Based Services in Mobile Commerce", 2004, retrieved from <https://msu.edu/~steinfie/elifelbschap.pdf> on Jul. 18, 2016, 15 pages.
(IPEA/409) International Preliminary Report on Patentability Chapter II or (IB/373) International Preliminary Report on Patentability Chapter I dated Jun. 21, 2017 for WO Application No. PCT/IB16/052317.
Preinterview First Office Action received for U.S. Appl. No. 16/222,656, dated Feb. 25, 2019, 4 pages.

* cited by examiner

| Event | Location | Configurable Parameters | | | | | |
|---|---|---|---|---|---|---|---|
| | | Level | Entity / Location | Entity / Location | Entity / Location | Entity / Location | Entity / Location |
| LB Notifications, Deliveries | Garage at Home | 2 | Registered Mobile | John's Home | N/A | N/A | N/A |
| LB Notifications, Deliveries | Front Door at Home | 3 | John's Mobile | John's Home | John's Vehicle | N/A | N/A |
| LB Notifications, Deliveries | Front Door at Work | 4 | John's Mobile | John's Work | John's Vehicle | Item | N/A |
| LB Notifications, Pick-Ups, Deliveries | Mobile Customer | 5 | John's Mobile | John's Vehicle | Carrier Vehicle | Item | Carrier Mobile |

Fig. 7

LOCATION-BASED PICK UP AND DELIVERY SERVICES

CROSS-REFERENCE TO RELATED APPLICATIONS

This application claims priority to U.S. Provisional Application No. 62/152,155 filed Apr. 24, 2015, which is hereby incorporated herein in its entirety by reference.

BACKGROUND

With an ever-increasing need for mobility and flexibility in item/shipment drop-off and item/shipment delivery contexts, new techniques and approaches for facilitating item/shipment delivery at various locations and for providing appropriately timed alerts to users regarding item/shipment delivery and drop-off. However, coordination of item/shipment drop-off or delivery at various locations that is efficient for the carrier and convenient for a customer tends to be highly time-sensitive.

BRIEF SUMMARY

In general, embodiments of the present invention provide methods, apparatus, systems, computing devices, computing entities, and/or the like for providing flexible location-based events and/or location-based notifications/messages.

According to one aspect of the present invention, a method is provided. In various embodiments, the method comprises receiving location information for an item. The location information indicates the current physical location of the item. The method further comprises determining whether the item is located within a first configurable distance of an entity. Responsive to determining that the item is located within the first configurable distance of the entity, first location information for the consignee of the item and second location information for the consignee of the item is requested. The method further comprises determining whether the consignee is within a second configurable distance of the entity based at least in part on the first location information for the consignee and the second location information for the consignee; and, in response to determining that the consignee is within the second configurable distance of the entity, providing a notification for display via a user interface of an application executing on a customer computing entity. In example embodiments, the entity is an establishment.

According to another aspect of the present invention, an apparatus is provided. In various embodiments the apparatus comprises at least one processor and at least one memory including program code. The at least one memory and the program code are configured to, with the processor, cause the apparatus to at least receive location information for an item. The location information indicating the current physical location of the item. The at least one memory and the program code are further configured to, with the processor, cause the apparatus to at least determine whether the item is located within a first configurable distance of an entity; responsive to determining that the item is located within the first configurable distance of the entity, request first location information for the consignee of the item and second location information for the consignee of the item; determine whether the consignee is within a second configurable distance of the entity based at least in part on the first location information for the consignee and the second location information for the consignee; and, in response to determining that the consignee is within the second configurable distance of the entity, provide a notification for display via a user interface of an application executing on a customer computing entity. In example embodiments, the entity is an establishment.

According to yet another aspect of the present invention, a computer program product is provided. In various embodiments, the computer program product comprises at least one non-transitory computer-readable storage medium having computer-readable program code portions stored therein. The computer-readable program code portions comprise an executable portion configured to receive location information for an item. The location information indicating the current physical location of the item. The computer-readable program code portions further comprise an executable portion configured to determine whether the item is located within a first configurable distance of an entity and an executable portion configured to responsive to determining that the item is located within the first configurable distance of the entity, request first location information for the consignee of the item and second location information for the consignee of the item. The computer-readable program code portions further comprise an executable portion configured to determine whether the consignee is within a second configurable distance of the entity based at least in part on the first location information for the consignee and the second location information for the consignee and an executable portion configured to, in response to determining that the consignee is within the second configurable distance of the entity, provide a notification for display via a user interface of an application executing on a customer computing entity. In example embodiments, the entity is an establishment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 6-19 and 22 are exemplary input and output produced in accordance with various embodiments of the present invention.

Figure 1:
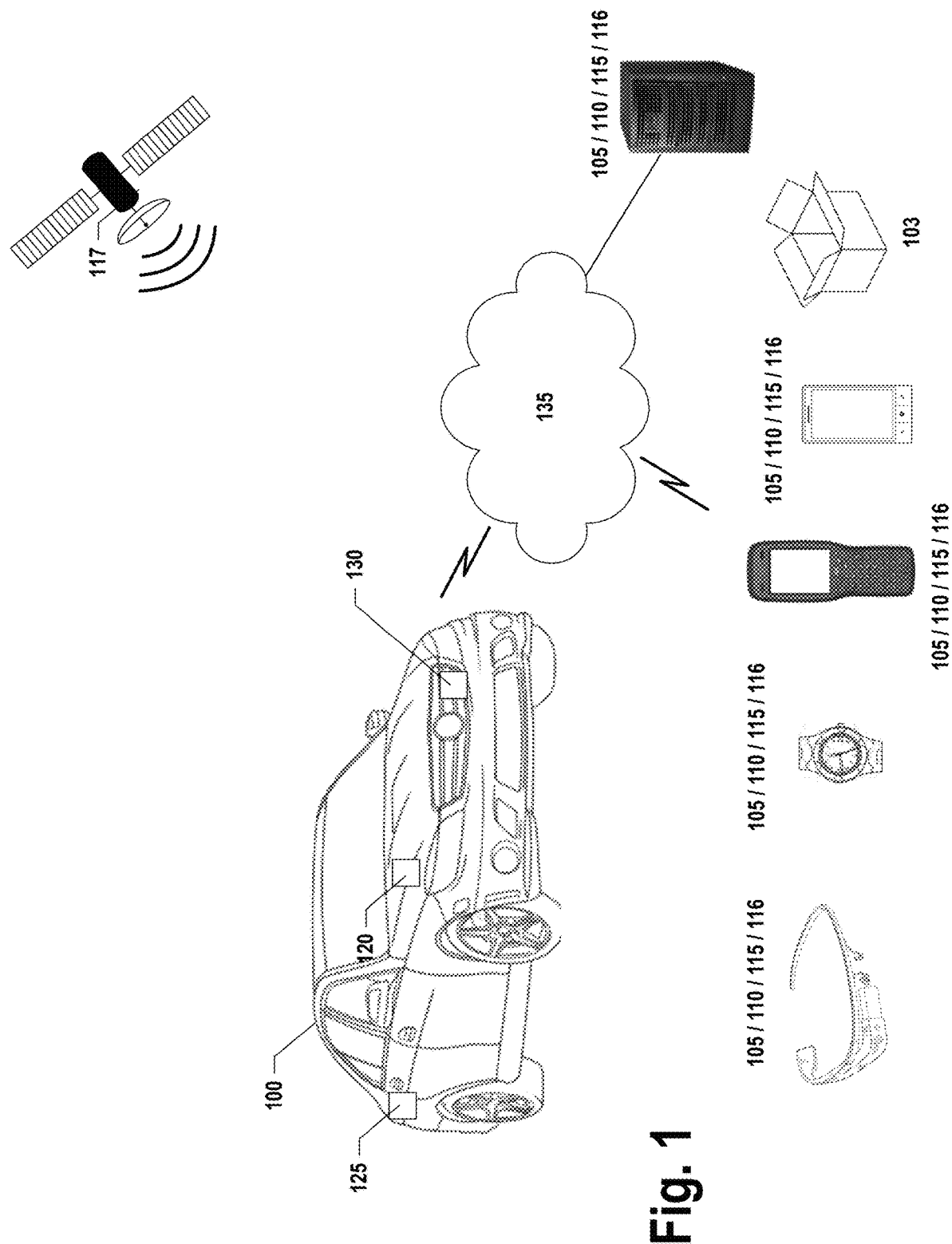
FIG. 1 is a diagram of a system that can be used to practice various embodiments of the present invention.

FIGS. 20, 21, 23, and 24 are flowcharts illustrating operations and process that can be used in accordance with various embodiments of the present invention.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a system that can be used in conjunction with various embodiments of the present invention. As shown in FIG. 1, the system may include one or more vehicles 100, one or more items 103, one or more carrier computing entities 105, one or more customer computing entities 110, one or more user computing entities 115, one or more establishment computing entities 116, one or more Global Positioning System (GPS) satellites 117, one or more location sensors 120, one or more telematics sensors 125, one or more information/data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

1. Exemplary Vehicle

In various embodiments, the term vehicle 100 is used generically. In one embodiment, a vehicle may be a carrier vehicle, such as a manned or an unmanned tractor, a truck, a delivery vehicle, a car, a motorcycle, a moped, a Segway, a bicycle, a golf cart, a hand truck, a cart, a trailer, a tractor and trailer combination, a van, a flatbed truck, a vehicle, a drone, an aerial vehicle, an airplane, a helicopter, a barge, a boat, and/or any other form of object for moving or transporting people and/or items (e.g., one or more packages, parcels, bags, containers, loads, crates, items banded together, vehicle parts, pallets, drums, the like, and/or similar words used herein interchangeably). As noted above, in instances where the vehicle is a carrier vehicle, the vehicle may be a self-driving delivery vehicle or the like. Thus, for the purpose of the present disclosure, the term driver of a delivery vehicle may be used to refer to a carrier personnel who drives a delivery vehicle and/or delivers items therefrom, an autonomous system configured to deliver items (e.g., a robot configured to transport items from a vehicle to a delivery location such as a customer's front door), and/or the like.

Further, a vehicle may be a customer vehicle, an establishment vehicle, and/or the like. In one embodiment, each vehicle 100 may be associated with a unique vehicle identifier (such as a vehicle ID) that uniquely identifies the vehicle 100. The unique vehicle ID may include characters, such as numbers, letters, symbols, and/or the like. For example, an alphanumeric vehicle ID (e.g., "AS445" and/or "1G6AF5SX6D0125409") may be associated with each vehicle 100. In another embodiment, the unique vehicle ID may be the license plate, registration number, or other identifying information/data assigned to the vehicle 100.

Figure 2:
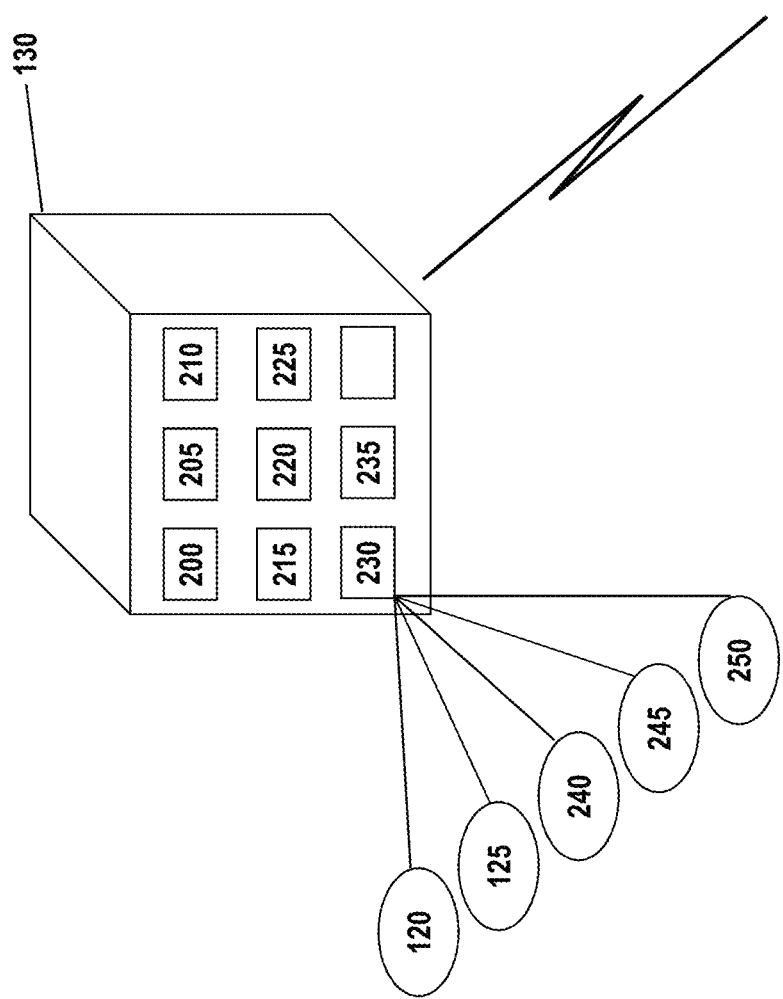
FIG. 2 is a diagram of an information/data collection device that may be used in association with certain embodiments of the present invention.

FIG. 1 shows one or more computing entities, devices, and/or similar words used herein interchangeably that are associated with the vehicle 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a vehicle 100. The information/data collection device 130 may collect telematics information/data (including location data) and transmit/send the information/data to various other computing entities via one of several communication methods.

In one embodiment, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle 100 but external to the information/data collection device 130.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 117, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (CARRIER) coordinate systems; and/or the like. Alternatively, triangulation may be used in connection with a device associated with a particular vehicle 100 and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with a variety of computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological information/data (e.g., referred to herein as telematics data).

In one embodiment, the ECM 245 may be one of several components in communication with and/or available to the information/data collection device 130. The ECM 245, which may be a scalable and subservient device to the information/data collection device 130, may have information/data processing capability to decode and store analog and digital inputs from vehicle systems and sensors. The ECM 245 may further have information/data processing capability to collect and present telematics information/data to the J-Bus (which may allow transmission to the information/data collection device 130), and output standard vehicle diagnostic codes when received from a vehicle's J-Bus-compatible on-board controllers 240 and/or sensors.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

2. Exemplary Item

In one embodiment, an item/shipment 103 may be any tangible and/or physical object. In one embodiment, an item/shipment 103 may be or be enclosed in one or more packages, envelopes, parcels, bags, goods, products, containers, loads, crates, items banded together, vehicle parts, pallets, drums, the like, and/or similar words used herein interchangeably. In one embodiment, each item/shipment 103 may include and/or be associated with an item/shipment identifier, such as an alphanumeric identifier. Such item/shipment identifiers may be represented as text, barcodes, tags, character strings, Aztec Codes, MaxiCodes, Data Matrices, Quick Response (QR) Codes, electronic representations, and/or the like. A unique item/shipment identifier (e.g., 123456789) may be used by the carrier to identify and track the item/shipment 103 as it moves through the carrier's transportation network. Further, such item/shipment identifiers can be affixed to items 103 by, for example, using a sticker (e.g., label) with the unique item/shipment identifier printed thereon (in human and/or machine readable form) or an RFID tag with the unique item/shipment identifier stored therein. Such items may be referred to as "connected" items 103 and/or "non-connected" items 103.

In one embodiment, connected items 103 include the ability to determine their locations and/or communicate with various computing entities. This may include the item/shipment 103 being able to communicate via a chip or other devices, such as an integrated circuit chip, RFID technology, Near Field Communication (NFC) technology, Bluetooth technology, Wi-Fi technology, and any other suitable communication techniques, standards, or protocols with one another and/or communicate with various computing entities for a variety of purposes. Connected items 103 may include one or more components that are functionally similar to those of the carrier computing entity 105 and/or the customer computing entity 110 as described below. For example, in one embodiment, each connected item/shipment 103 may include one or more processing elements, one or more display device/input devices (e.g., including user interfaces), volatile and non-volatile storage or memory, and/or one or more communications interfaces. In this regard, in some example embodiments, an item/shipment 103 may communicate send "to" address information/data, received "from" address information/data, unique identifier codes, location information/data, status information/data, and/or various other information/data.

In one embodiment, non-connected items 103 do not typically include the ability to determine their locations and/or might not be able communicate with various computing entities or are not designated to do so by the carrier. The location of non-connected items 103 can be determined with the aid of other appropriate computing entities. For example, non-connected items 103 can be scanned (e.g., affixed barcodes, RFID tags, and/or the like) or have the containers or vehicles in which they are located scanned or located. As will be recognized, an actual scan or location determination of an item/shipment 103 is not necessarily required to determine the location of an item/shipment 103. That is, a scanning operation might not actually be performed on a label affixed directly to an item/shipment 103 or location determination might not be made specifically for or by an item/shipment 103. For example, a label on a larger container housing many items 103 can be scanned, and by association, the location of the items 103 housed within the container are considered to be located in the container at the scanned location. Similarly, the location of a vehicle 100 transporting many items can be determined, and by association, the location of the items 103 being transported by the vehicle 100 are considered to be located in the vehicle 100 at the determined location. These can be referred to as "logical" scans/determinations or "virtual" scans/determinations. Thus, the location of the items 103 is based on the assumption they are within the container or vehicle 100, despite the fact that one or more of such items 103 might not actually be there. Further when an item/shipment is delivered, the location of the delivery location (e.g., the GPS location of the building to which the item/shipment is delivered), the location of a user computing entity 115 associated with the carrier delivery person at the time the carrier delivery person scans the item/shipment (e.g., affixed barcode, RFID tag, and/or the like) at the time of delivery, the location of a vehicle 100 (e.g., a delivery vehicle 100) at the time when the delivery of the item/shipment is logged, and/or the like may be assigned to the item/shipment at the time of delivery.

3. Exemplary Carrier Computing Entity

Figure 3:
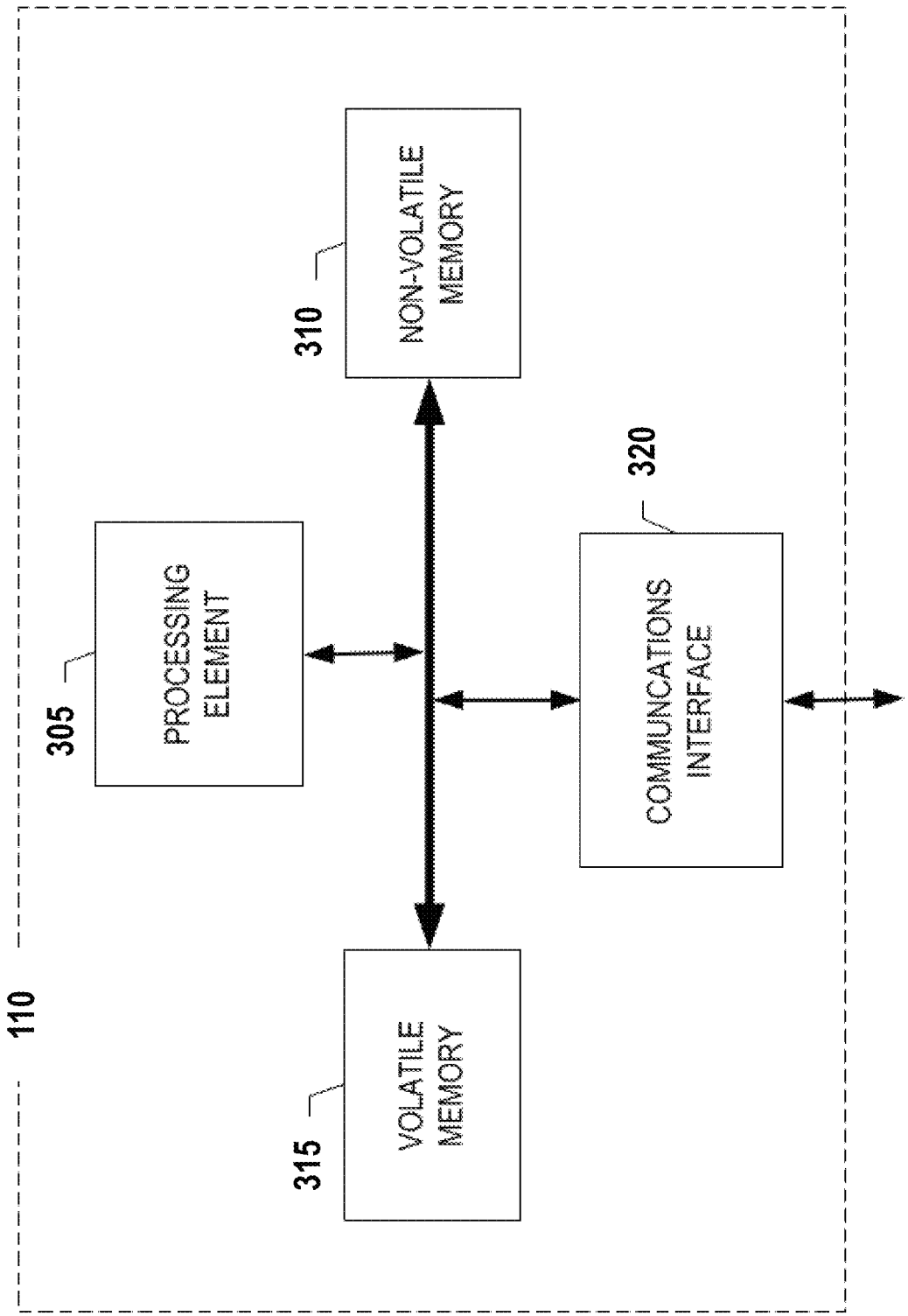
FIG. 3 is a schematic of a carrier computing entity in accordance with certain embodiments of the present invention.

FIG. 3 provides a schematic of a carrier computing entity 105 according to one embodiment of the present invention.

A carrier may be a traditional carrier, such as United Parcel Service, FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. A carrier computing entity 105 may be located at a carrier location and/or the like, such as a carrier service center, will call, kiosk, drop-box, locker system, hub, facility, and/or the like. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing entity 105 may also include one or more communications interfaces 320 for communicating with various computing entities, such as by communicating data, content, information, and/or similar terms used herein interchangeably that can be transmitted, received, operated on, processed, displayed, stored, and/or the like. The carrier computing entity 105 can also be used for making, receiving, and/or transferring payments. Payments may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, Bluetooth low energy (BLE), and various other contactless payment systems. Further, such payment technologies may include PayPal Beacon, Booker, Erply, Leaf, Apple Pay, Leapset, Micros, PayPal Here, Revel, ShopKeep, TouchBistro, Vend, and/or the like.

As shown in FIG. 3, in one embodiment, the carrier computing entity 105 may include or be in communication with one or more processing elements 305 (also referred to as processors, processing circuitry, and/or similar terms used herein interchangeably) that communicate with other elements within the carrier computing entity 105 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the carrier computing entity 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the carrier computing entity 105 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the carrier computing entity 105 with the assistance of the processing element 305 and operating system.

As indicated, in one embodiment, the carrier computing entity 105 may also include one or more communications interfaces 320 for communicating with various computing entities, such as by communicating data, content, information, and/or similar terms used herein interchangeably that can be transmitted, received, operated on, processed, displayed, stored, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier computing entity 105 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the carrier computing entity 105 may include or be in communication with one or more input elements, such as a keyboard input, a mouse input, a touch screen/display input, audio input, pointing device input, joystick input, keypad input, and/or the like. The carrier computing entity 105 may also include or be in communication with one or more output elements (not shown), such as audio output, video output, screen/display output, motion output, movement output, and/or the like.

As will be appreciated, one or more of the carrier computing entity's 105 components may be located remotely from other carrier computing entity 105 components, such as in a distributed system. Furthermore, one or more of the components may be combined and additional components performing functions described herein may be included in the carrier computing entity 105. Thus, the carrier computing entity 105 can be adapted to accommodate a variety of needs and circumstances.

4. Exemplary Customer Computing Entity

Figure 4:
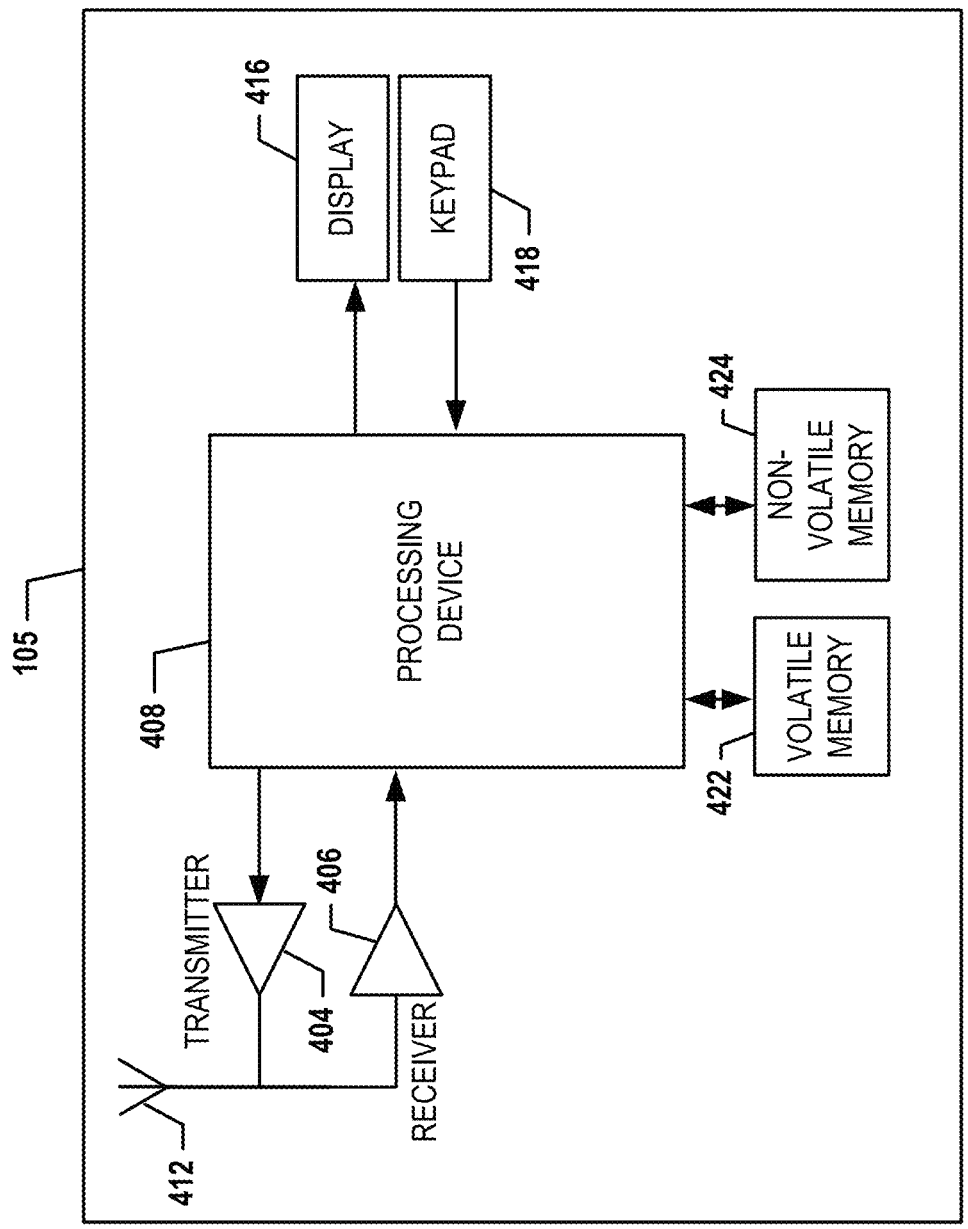
FIG. 4 is a schematic of a customer computing entity in accordance with certain embodiments of the present invention.

A customer may be an individual, a family, a family member, a company, an organization, an entity, a department within an organization, a representative of an organization and/or person, and/or the like. Depending on the context, customers may be consignors/shippers and/or consignees/receivers. Accordingly, the term customer may refer to both consignors and/or consignees interchangeably. FIG. 4 provides an illustrative schematic representative of a customer computing entity 110 that can be used in conjunction with embodiments of the present invention. In one embodiment, the customer computing entities 110 may include one or more components that are functionally similar to those of the carrier computing entity 105 and/or as described below. As shown in FIG. 4, a customer computing entity 110 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 100, carrier computing entities 105, and/or the like. In this regard, the customer computing entity 110 may be capable of operating with one or more air interface standards, communication protocols, modulation types, and access types. More particularly, the customer computing entity 110 may operate in accordance with any of a number of wireless communication standards and protocols. In a particular embodiment, the customer computing entity 110 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the customer computing entity 110 can communicate with various other entities using concepts such as Unstructured Supplementary Service information/data (USSD), Short Message Service (SMS), Multimedia Messaging Service (MIMS), Dual-Tone Multi-Frequency Signaling (DTMF), and/or Subscriber Identity Module Dialer (SIM dialer). The customer computing entity 110 can also download changes, add-ons, and updates, for instance, to its firmware, software (e.g., including executable instructions, applications, program modules), and operating system. For example, in one embodiment, the customer computing entity 110 may store and execute a carrier application to assist in communicating with the carrier and/or for providing location services regarding the same.

According to one embodiment, the customer computing entity 110 may include location determining aspects, devices, modules, functionalities, and/or similar words used herein interchangeably. For example, the customer computing entity 110 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the customer computing entity's 105 position in connection with a variety of other systems, including cellular towers, Wi-Fi access points, and/or the like. Similarly, the customer computing entity 110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The customer computing entity 110 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the customer computing entity 110 to interact with and/or cause display of information. The user input interface can comprise any of a number of devices allowing the customer computing entity 110 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the customer computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the customer computing entity can collect contextual information/data as part of the telematics data.

The customer computing entity 110 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the customer computing entity 110.

5. Exemplary User Computing Entity

As will be recognized, user computing entities 115 can be operated by various parties, including a carrier pick-up/delivery person and/or operators of vehicles 100. For example, a user may be a carrier pick-up/delivery person picking up items from and/or delivering items to customers. Moreover, a user computing entity 115 may include one or more components that are functionally similar to those of the carrier computing entity 105 and/or the customer computing entity 110. For example, in one embodiment, each user computing entity 115 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the user computing entity 115 to interact with and/or cause display of information from various other computing entities. As will be recognized, these architectures and descriptions are provided for exemplary purposes only and are not limiting to the various embodiments.

6. Exemplary Establishment and/or Establishment Computing Entity

In one embodiment, an establishment (also referenced as a location or physical address) may be a residence, work location, customer delivery location, customer pick-up location, multi-tenant dwelling, commercial office building, apartment, and/or the like. In another embodiment, an establishment by be an organization or entity that provides various products, items, foods, services, and/or the like. For example, an establishment may be a brick-and-mortar store, service center, kiosk, locker system, warehouse, office building, and/or the like. A customer may register such establishments as secure establishments for pick-ups and/or deliveries. E-commerce establishments may include macys.com, dell.com, walmart.com, apple.com, staples.com, amazon.com, bestbuy.com, costco.com, alibaba.com, ebay.com, netflix.com, sears.com. Other establishments may include physical locations that customers can visit, such as Starbucks, Target, Publix, schools, Joe's Crab Shack, and/or the like. And further establishments may include hospitals, health clinics, legal offices, government buildings, and/or the like. The coordinates and/or location information of the establishment can be determined and stored by a variety of computing entities. In various embodiments, an establishment may register with the carrier as a pick-up/delivery location. An establishment may be associated with and/or have on the premises one or more establishment computing entities 116. An establishment computing entity 116 may include one or more components that are functionally similar to those of the carrier computing entity 105, the customer computing entity 110, the user computing entity 115, and/or the like. In one embodiment, each establishment computing entity 116 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the establishment computing entity 116 to interact with and/or cause display of information from various other entities. As will be recognized, these architectures and descriptions are provided for exemplary purposes only and are not limiting to the various embodiments.

In one embodiment, establishment computing entities 116 may be fixed with regard to their geographic locations. As will be recognized, a variety of other approaches and techniques can be used to adapt to various needs and circumstances.

7. Exemplary Additional Computing Entities

As will be recognized, a variety of other computing entities and devices can be used to adapt to various needs and circumstances. For example, one or more service provider computing entities and one or more customer computing entities may be used with embodiments of the present invention. Such computing entities may include components and functionality similar to those described above.

III. EXEMPLARY SYSTEM OPERATION

Figure 5:
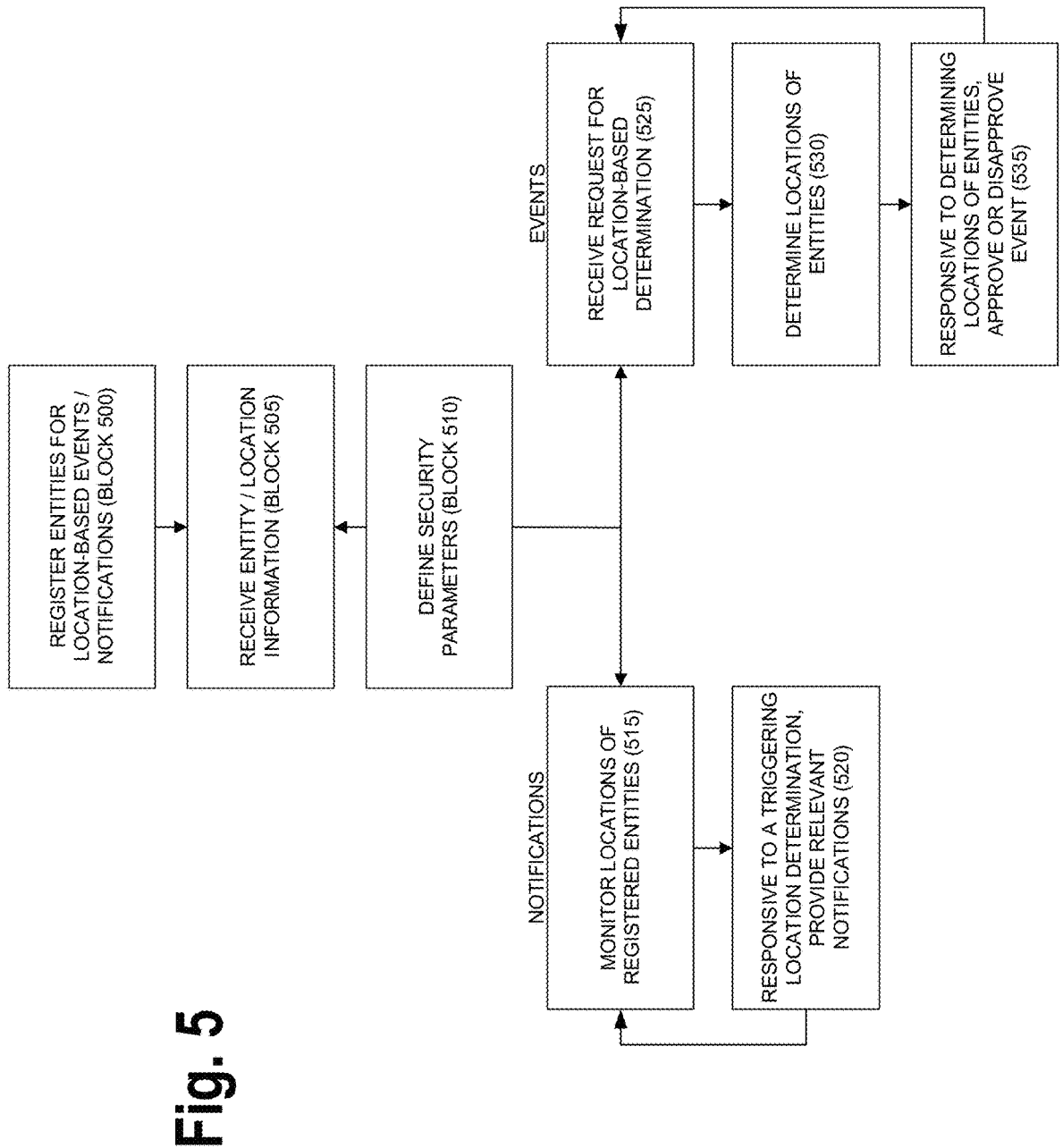
FIG. 5 is a flowchart illustrating operations and processes that can be used in accordance with various embodiments of the present invention.

Reference will now be made to FIGS. 5-19. FIG. 5 is a flowchart illustrating operations and processes that can be used in accordance with various embodiments of the present invention. FIGS. 6-19 are exemplary input and output produced in accordance with various embodiments of the present invention.

1. Registration

In one embodiment, as indicated in Block 500 of FIG. 5, the process may begin with the enrollment/registration of one or more customers for an account, subscription, program, and/or similar words used herein interchangeably. In another embodiment, the customer may be automatically enrolled/registered for the same. As previously noted, a customer may be an individual, a family, a family member, a company, an organization, an entity, a department within an organization, a representative of an organization and/or person, and/or the like. To register, a customer (e.g., a customer operating a customer computing entity 110) may access a webpage, application, dashboard, browser, or portal of an entity that provides notification/message services.

In one embodiment, as part of the enrollment/registration process, a customer (e.g., a customer operating a customer computing entity 110) may be requested to provide information/data (e.g., including customer information/data, biographic information/data, geographic information/data, device/entity information/data, establishment information/data, payment information/data, and/or the like) by the carrier computing entity 105 (e.g., via the registration module). The information/data may be manually input by a customer; may be automatically provided by allowing access to other accounts, such as Amazon.com, Facebook, Gmail, Twitter, PayPal, and/or the like; may be automatically collected by various computing entities (including automatic device identification); combinations thereof; and/or other techniques and approaches. For instance, the biographic information/data may include the customer's name, such as a first name, a last name, a company name, an entity name, an organization name, and/or the like. The geographic information/data may also include one or more physical addresses or locations associated with the customer (e.g., street address, city, state, postal code, and/or country). The physical addresses or locations may be establishment commercial addresses, residential addresses, commercial addresses, geocodes, latitude and longitude points, virtual addresses, and/or the like.

In one embodiment, the customer information/data may include one or more communication formats for communicating with the customer as part of his or her notification/message preferences. The communication formats may include text notifications/messages (e.g., SMS, MMS), email notifications/messages, voice notifications/messages, video notifications/messages (e.g., YouTube, the Vine), picture notifications/messages (e.g., Instagram), social media notifications/messages (e.g., private social media created internally for entities, business social media (e.g., Yammer, SocialCast), or public social media (e.g., Facebook, Instagram, Twitter)), and/or a variety of other notifications/messages in various communication formats. In addition to the one or more communication formats, the customer (e.g., operating a customer computing entity 110) can provide the corresponding electronic destination addresses to be used in providing information/data associated with the notification/message services to the customer (e.g., email addresses, online handles, phone numbers, usernames, etc.). For instance, for text notifications/messages, the customer may provide one or more cellular phone numbers. For email notifications/messages, the customer may provide one or more email addresses. And for voice notifications/messages, the customer may provide one or more cellular or landline phone numbers or other electronic destination addresses to which audio files can be delivered. In various embodiments, the customer may download a carrier application onto the customer computing entity 110. Notification/messages may be provided through the carrier application operating on the customer computing entity 110. For example, the notification/message may be provided to the user computing entity 110 based on the customer profile associated with the user computing entity 110. In various embodiments, the notifications/messages may be provided to the customer by the carrier application operating on the computing entity 110 by a push notification, by the user computing entity 110 execution of at least a portion of notification/message causing the user computing entity 110 to display at least a portion of the notification/message to the user via the user computing entity 110 user interface and/or a specific user interface provided by the carrier application, and/or the like. Additionally, in one embodiment, validation operations can be performed with respect to each input electronic destination address—to ensure accuracy. As will be recognized, a variety of other types of electronic destination addresses can be used to adapt to various needs and circumstances.

Figure 6:
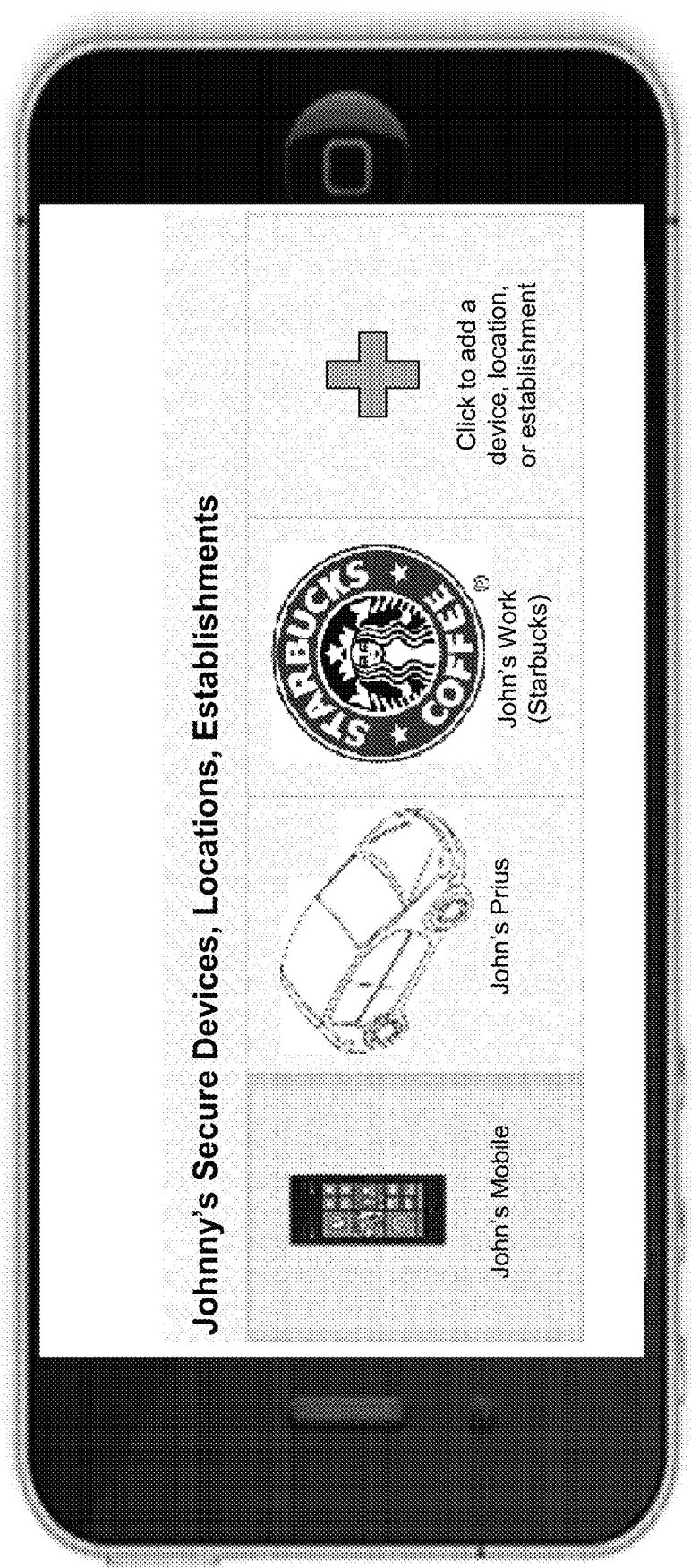
Figure 8:
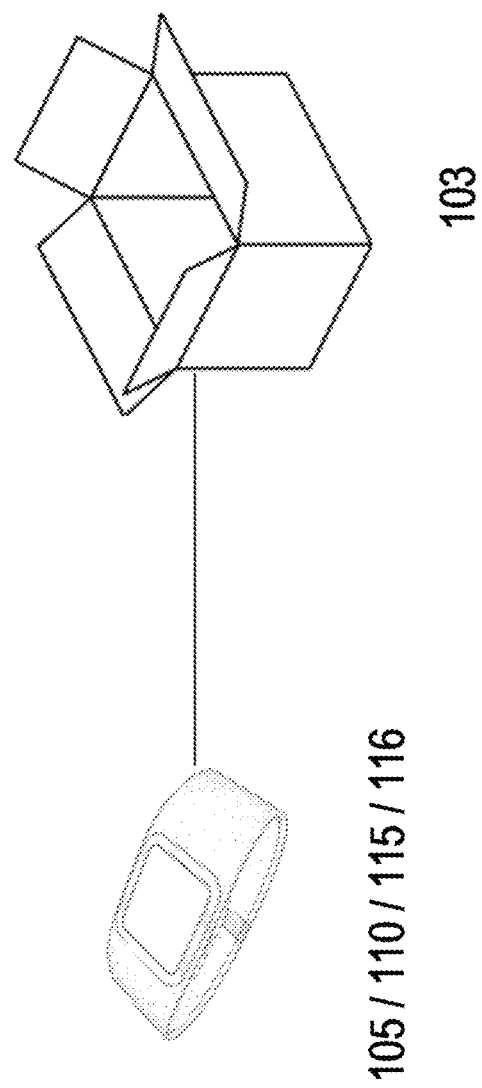
Figure 9:
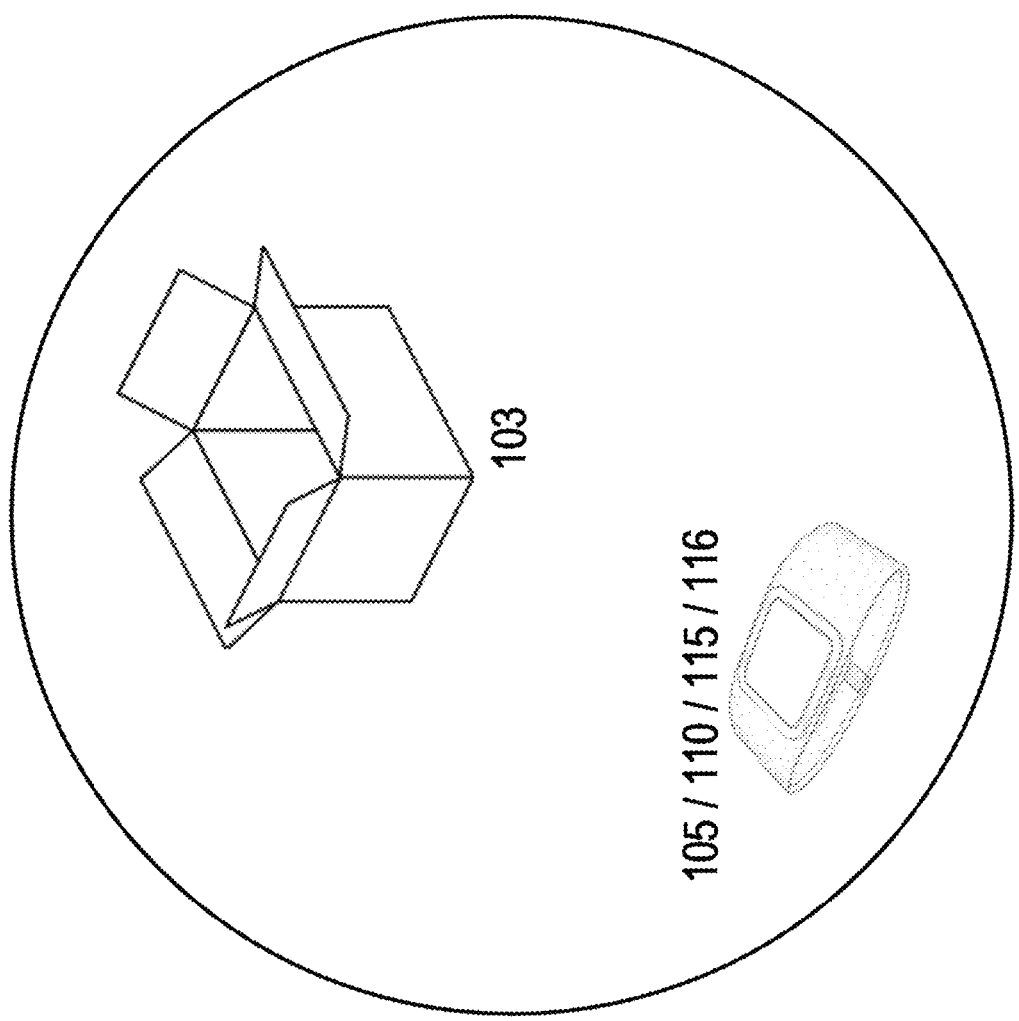

In one embodiment, as indicated in Block 505 of FIG. 5, device/entity information/data, customer information/data, establishment information/data, physical address or location information/data, and/or the like (customer computing entities 110, user computing entities 115, establishment computing entities 116, establishments, vehicles 100, and/or the like) may be received, provided, obtained, detected, assigned, collected, requested, and/or similar words used herein interchangeably as part of the registration/enrollment process. As will be recognized, device/entity information/data may be collected for any number of devices or entities for association with a customer's account, subscription, program, and/or similar words used herein interchangeably. The device/entity information/data may include one or more entity or device identifiers—phone numbers, Subscriber Identity Module (SIM) numbers, Media Access Control (MAC) addresses, International Mobile Subscriber Identity (IMSI) numbers, Internet Protocol (IP) addresses, Mobile Equipment Identifiers (MEIDs), unit identifiers (e.g., GPS unit identifiers, Unique Device Identifiers (UDiDs), mobile identification numbers (MINs), IMSI_S (Short IMSIs), email addresses, usernames, Globally Unique Identifiers (GUIDs), Integrated Circuit Card Identifiers (ICCIDs), electronic serial numbers (ESN), International Mobile Equipment Identities (IMEIs), Wi-Fi IDs, RFID tags, and/or the like. The device/entity information/data may include a device's vendor, model, specification authority, version, components, software specification and/or version, person associated with the device, and/or the like. The device/entity information/data may be used to track, monitor, connect with, communicate with, and/or the like the corresponding devices or entities. FIG. 6 shows an exemplary interface with the devices/entities, vehicles, locations, establishments, and/or the like associated with the given account. As shown in this figure, any information/data can be shown with regard to each corresponding device (including the names, nicknames, assigned names, and/or the like with whom the devices are associated). FIG. 6 shows John's mobile as being one of the devices/entities registered with his account.

As will be recognized from FIG. 5, various entities/devices, establishments, locations, and/or vehicles 100 can also be registered. For example, a customer can register or enroll his places of work, places he frequents, his home, and/or the like for secure location-based events and/or secure location-based notifications/messages. For example, John Smith may register his home at 123 Suburban Greens Drive, Atlanta, Ga. 33333. As part of registering his home, an appropriate computing entity can determine the location of the residence. For example, the latitude and longitude points can be determined via a query to a map database or website, by reverse geocoding, by interpolation, and/or the like. In this example, Mr. Smith's residence is located at 34.3218697, −83.1239871. In another example, Mr. Smith may work at Starbucks near his home—the Starbucks at 9999 Peachtree Road Northeast, Atlanta, Ga. 33331 (Store No. 20821943). As noted, the latitude and longitude points can be determined via a query to a map database or website, by reverse geocoding, by interpolation, and/or the like. In this example, the Starbucks is located at 33.7869128, −84.3875602. In one embodiment, the customer (e.g., operating a customer computing entity 110) can register establishments or locations as secure locations for pick-up and/or delivery services and/or for location-based notifications/messages. This may include defining one or more geofences, zones of confidence, and/or the like around the location and/or establishment. This may also include defining the size of the same-within carrier-imposed guidelines. As will be recognized, the customer can register any number of establishments and/or locations for secure location-based events and/or secure location-based notifications/messages. As shown in FIG. 6, the Starbucks is displayed via the interface as one of the registered locations or establishments. In some embodiments, the carrier may establish and maintain a set, database, list, and/or the like of registered establishments and/or locations and the corresponding geofence, radius, or zone about the establishment and/or location. In some such embodiments, the customer may select one or more of the registered establishments and/or locations from a provided list of registered establishments and/or locations as the customer's personally registered establishments and/or locations.

In one embodiment, customers can also register or enroll one or more vehicles 100 for secure location-based events and/or secure location-based notifications/messages. For instance, the customer (e.g., operating a customer computing entity 110) can register one or more of his vehicles for secure location-based events and/or secure location-based notifications/messages. The customer can register her own vehicle 100, a significant other's vehicle 100, a relative's vehicle, and/or the like. This may include providing access to or obtaining information/data associated with the vehicle and/or vehicle devices/entities, such as the information/data collection device 130, location sensors 120, telematics sensors 125, communication ports 230/205, information/data radios 235, and/or the like. This information/data may include SIM numbers, MAC addresses, IMSI numbers, IP addresses, MEIDs, unit identifiers, IMSI_S, email addresses, usernames, GUIDs, ICCIDs, ESN, IMEIs, Wi-Fi IDs, RFID tags, and/or the like. FIG. 6 shows John's Prius as being a registered vehicle 100.

In one embodiment, with the appropriate information/data, the carrier computing entity 105 may create a customer profile for the customer via the enrollment/registration process. Accordingly, the carrier computing entity 105 may create, store, and/or have access to various customer profiles and/or information/data associated with the customer profiles. In addition to at least the information/data described above, a customer profile may include one or more corresponding usernames, passwords, images, tokens, challenge phrases, reminders, and/or the like (referred to herein as credentials) for accessing accounts, applications, services, entities, and/or the like.

a. Customer-Defined Configurable/Determinable Parameters

In one embodiment, once a customer profile has been created by the carrier computing entity 105, the customer (e.g., operating a customer computing entity 110) can define, identify, provide, and/or similar words used herein interchangeably one or more configurable/determinable parameters to be used in association with the customer's account, subscription, and/or program (Block 510 of FIG. 5). For instance, the customer can define one or more configurable/determinable parameters (e.g., configurable levels) to be used in association with specific events/actions and/or messages/notifications. For example, the customer (e.g., operating a customer computing entity 110) can define the number of entities that are required to generate a notification/message to the customer or a carrier pick-up/delivery person (and/or various other parties), automatically allow or disallow delivery or pick-up of an item/shipment 103 (at a vehicle, at a residence, at a commercial location, at an establishment), confirm that an item/shipment 103 was picked up or delivered, and/or the like. In one embodiment, each event may be associated with its own configurable/determinable parameters (see FIG. 7). In another embodiment, all events may be associated with the same configurable/determinable parameters (see FIG. 7).

For example, in various embodiments, a customer may select to turn on various location-based alerts/notifications/messages. For example, the customer may select to turn on home delivery location-based alerts, alternate delivery location (ADL) location-based alerts, mobile delivery location-based alerts, establishment location-based alerts, mobile shipping location-based alerts, and/or the like. In various embodiments, a customer may select to turn on location-based alerts/notifications/messages such that the customer may be alerted/notified/messaged when an item to be delivered to the customer is within a first configurable distance from an entity and the customer is within a second configurable distance from an entity. In example embodiments, the entity may be the customer's home, an ADL, an establishment, a mobile shipping location (e.g., a drop box), and/or the like.

b. Carrier-Defined Configurable/Determinable Parameters

In one embodiment, once a customer profile has been created by a carrier computing entity 105, the carrier computing entity 105 can provide one or more configurable/determinable parameters to be used in association with the customer's account, subscription, and/or program (Block 510 of FIG. 5). For example, a carrier computing entity 105 can define one or more configurable/determinable parameters (e.g., configurable levels) to be used in association with specific events/actions and/or messages/notifications. As noted, in one embodiment, each event may be associated with its own configurable/determinable parameters. In another embodiment, all events may be associated with the same configurable/determinable parameters.

In various embodiments, the configurable/determinable parameters may include generating a notification/message to the customer or carrier pick-up/delivery person (and/or various other parties), automatically allowing or disallowing delivery of an item/shipment 103 (at a vehicle, at a residence, at a commercial location, at an establishment), confirming that an item/shipment 103 was picked up or delivered, and/or the like. For example, in one embodiment, in the pick-up and delivery context, certain geographic areas may be referred to as "non-driver release areas." Non-driver release areas are areas in which a carrier pick-up/delivery person may not leave an item/shipment 103 unclaimed and/or unattended as part of delivery. To identify such areas, historical delivery information/data may be analyzed. For example, historical delivery information/data may include information/data regarding the theft of or damage to items left by the carrier at addresses within specific geographic areas without first obtaining a signature. Using this historical delivery information/data, the carrier may identify non-driver release areas in which personnel are not generally permitted to leave an item/shipment 103 without first obtaining a signature. In such areas, carrier pick-up/delivery persons are typically required to obtain a signature of the consignee or recipient because carrier experience may indicate that the item/shipment 103 may be stolen or damaged after the item/shipment 103 is relinquished by the carrier. In one embodiment, carrier efficiency in non-driver release areas can be increased by not requiring return trips in the event a consignee or recipient is unavailable to sign for an item/shipment 103 if one or more defined configurable/determinable parameters are satisfied. For example, the carrier computing entity 105 can define the number of entities that are required to trigger a specific event/action—such as automatically allowing or disallowing delivery of an item, initiating shipment of an item, initiating movement of an item, generating shipping data, and/or the like. If the specified configurable/determinable parameters are satisfied, a carrier pick-up/delivery person can release the item/shipment 103 for delivery and reduce the number of delivery attempts at the delivery address. As will be recognized, a variety of other security concerns can be addressed by the technical solutions described herein.

c. Exemplary Configurable/Determinable Parameters

FIG. 7 provides exemplary configurable/determinable parameters to help in understanding embodiments of the present invention (Block 510 of FIG. 5). In FIG. 7, five different configurable levels are represented (level 2, level 3, level 4, level 5). In one embodiment, the following examples can be applied to location-based notifications/messages, pick-ups, and/or deliveries to registered vehicles (e.g., to the trunk of vehicle 100). To generate or transmit a notification/message and/or make a corresponding pick-up or delivery from a registered vehicle 100, the various levels can require the location of entities, vehicles, establishments, and/or the like to be determined, ascertained, or known.

In one embodiment, the level 2 example applies to location-based notifications/messages and/or deliveries at the garage of John's registered home (e.g., location or establishment). As will be recognized, in the delivery context, such deliveries may include the customer's garage door opening or simply leaving an item/shipment 103 at a closed or open garage door (see FIGS. 8, 9, 14). As an added measure of security, in this example, level 2 requires that any mobile device (e.g., a registered smartphone or wearable for any member of the residence) and a home/residence (e.g., or a desktop, television, smart thermostat, and/or the like at the home/residence) be properly determined as being within the configurable/determinable parameters (e.g., being within a geofence, a zone of confidence, or a defined proximity of one another). In some embodiments, this can ensure that a notification/message is generated in a time-appropriate matter and/or that a delivery is being made to the correct delivery location and/or increase the likelihood that someone at the delivery location is present to minimize the risk of releasing the item.

Figure 10:
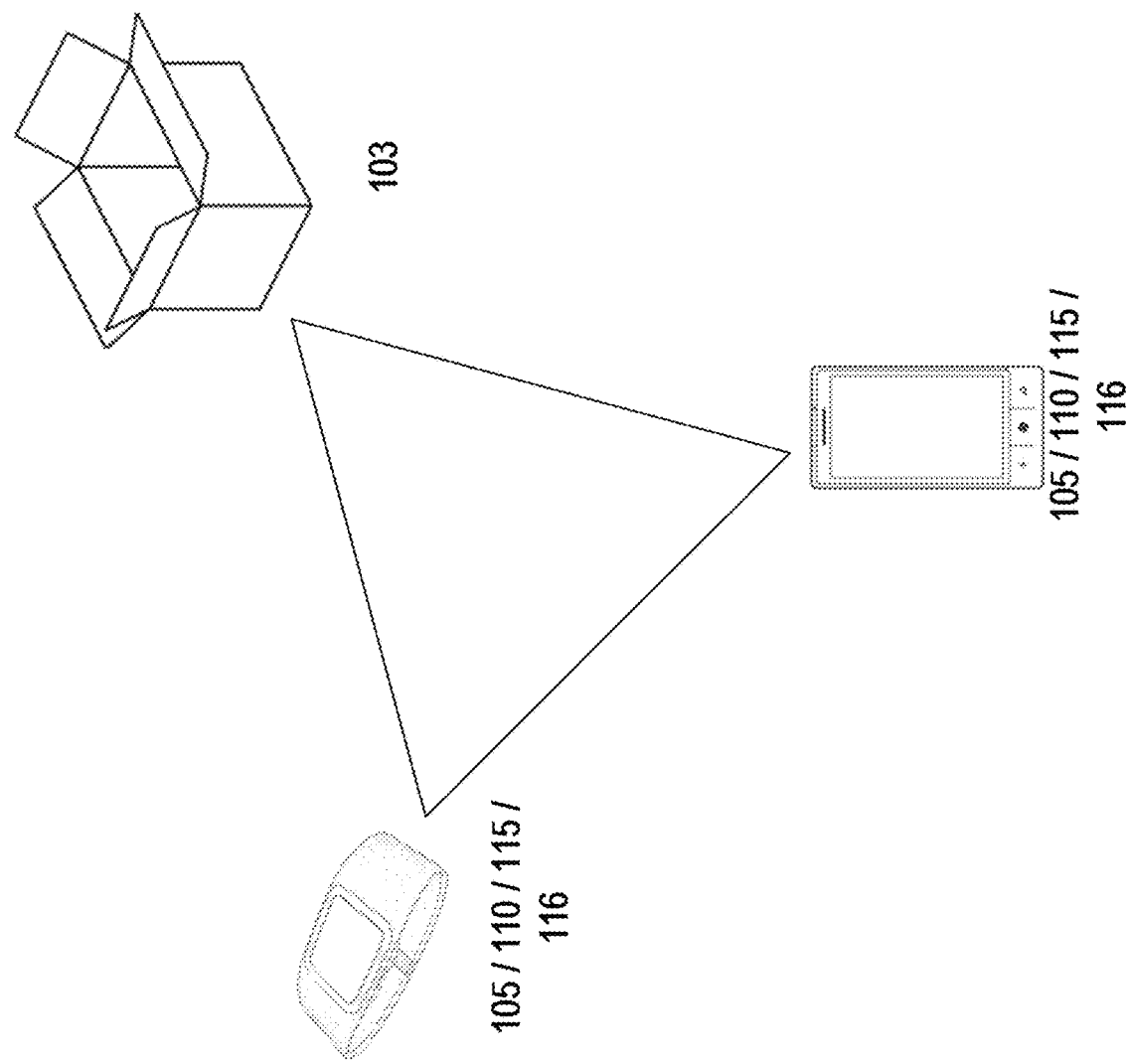
Figure 11:
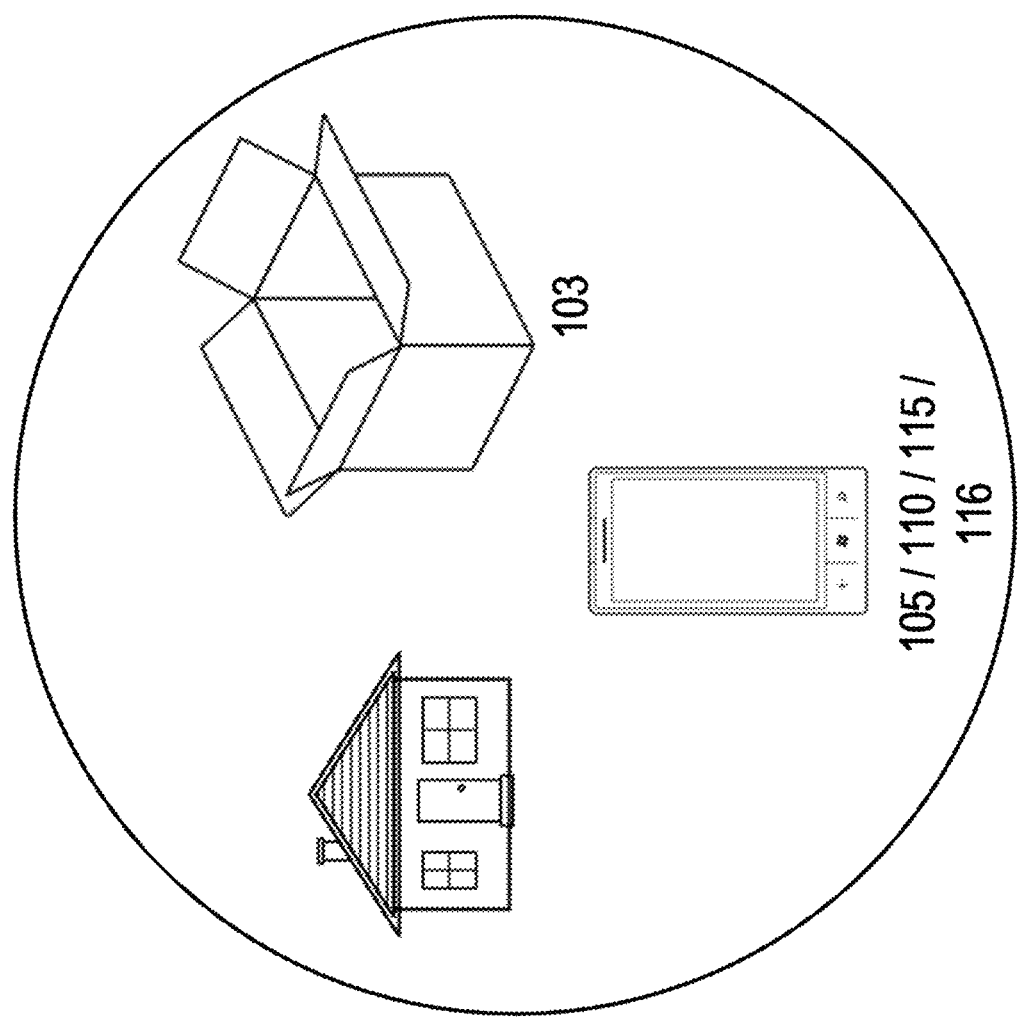
Figure 12:
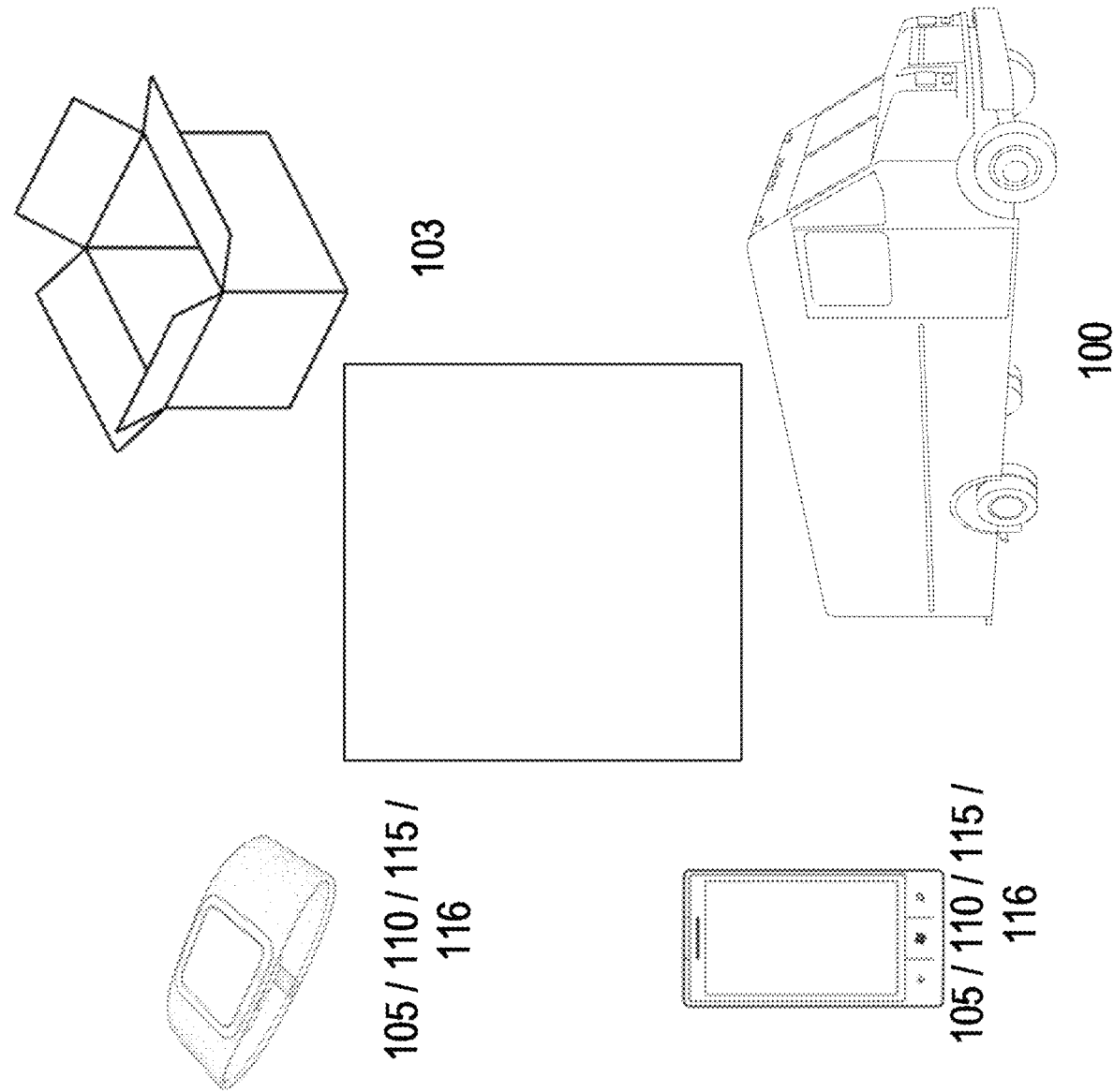
Figure 13:
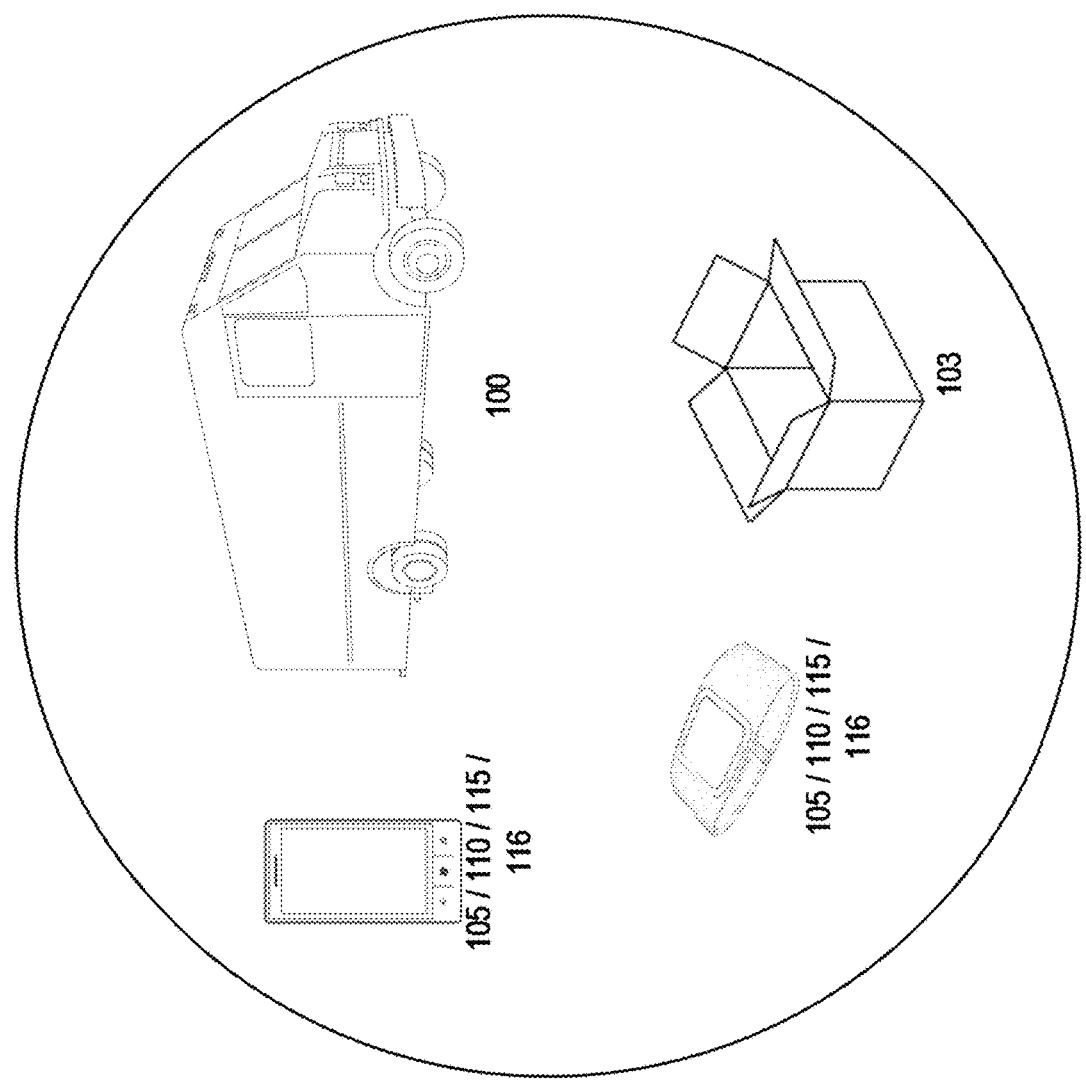
Figure 14:
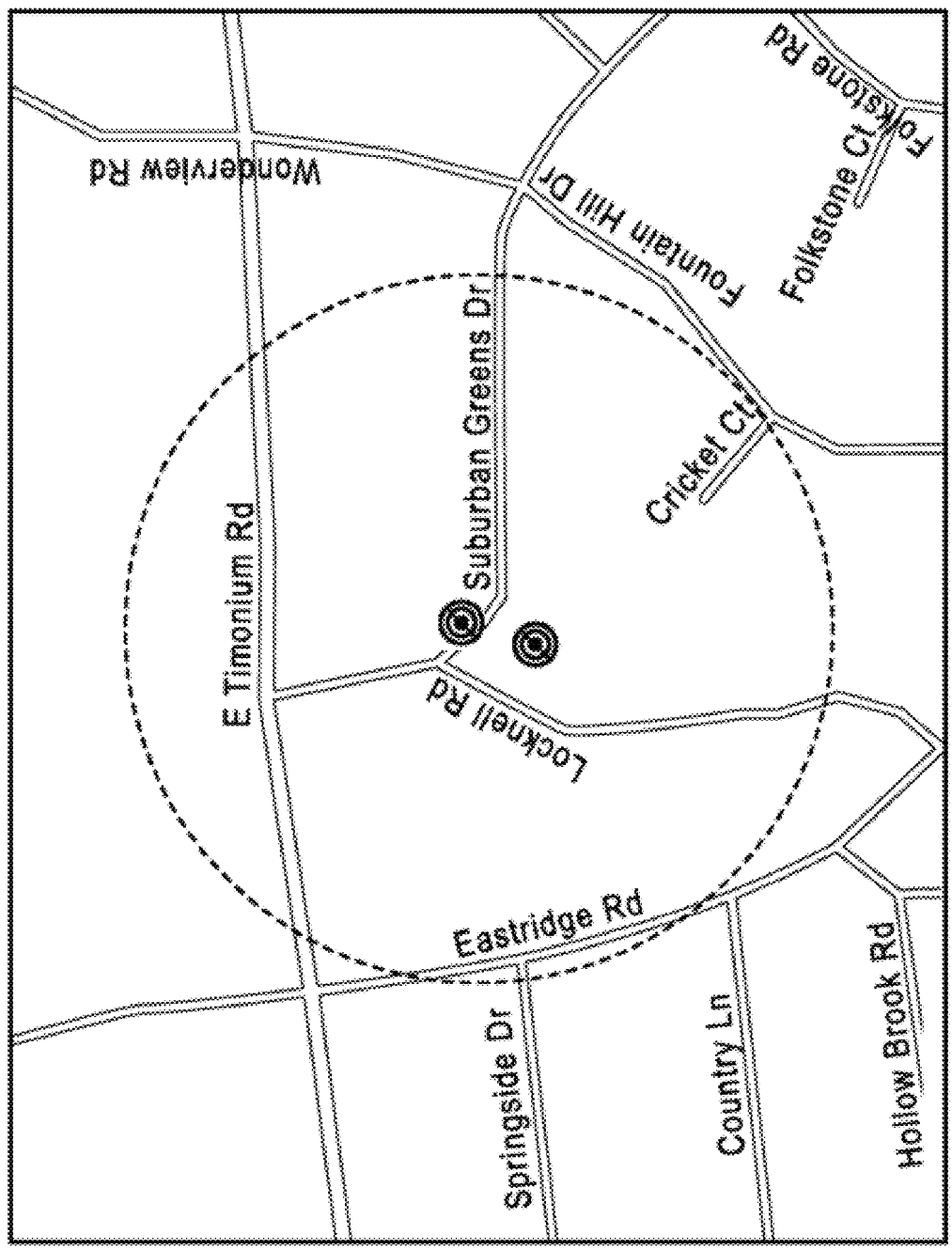
Figure 15:
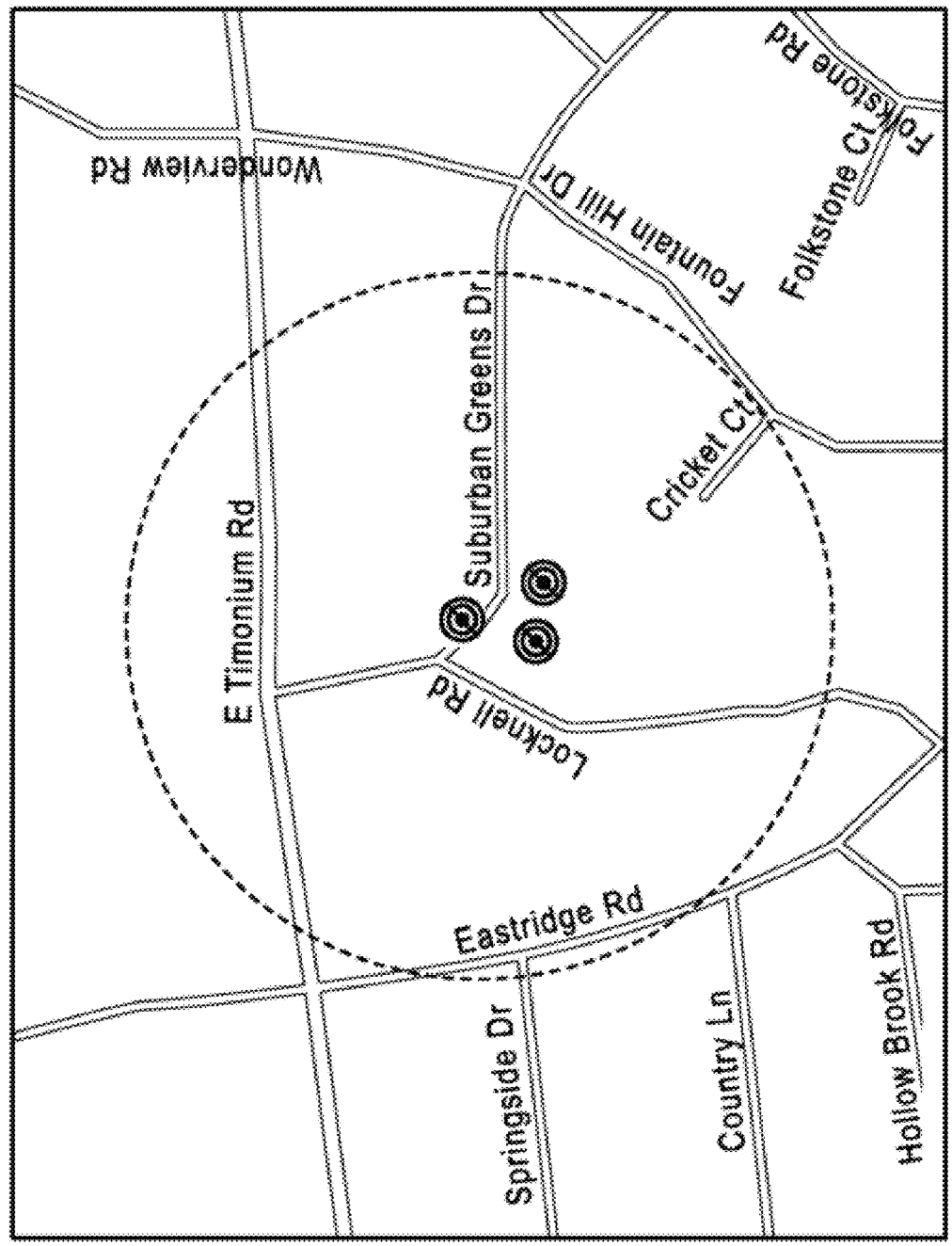
Figure 16:
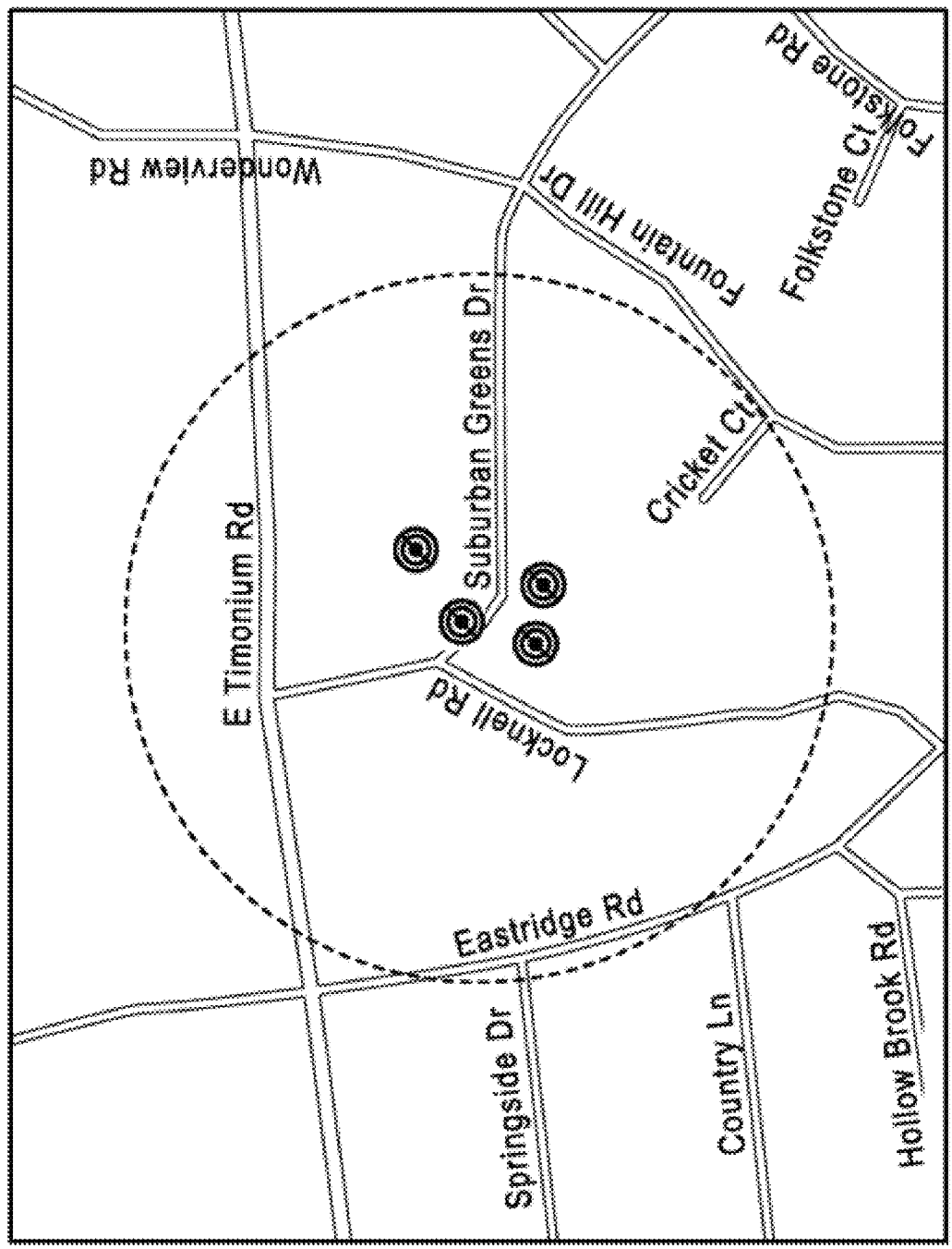

In one embodiment, the level 3 example applies to location-based notifications/messages and/or deliveries at the front door of a registered home (See FIGS. 10, 11, 15). As will be recognized, in the delivery context, such deliveries may include leaving the item/shipment 103 near the front door of a residence in a highly-visible location. Thus, as an added measure of security, in this example, level 3 requires that John's mobile device (e.g., registered smartphone or wearable), John's home/residence (e.g., or a desktop, television, smart thermostat, and/or the like at the home/residence), and John's vehicle 100 be properly determined as being within the configurable/determinable parameters (e.g., being within a geofence, a zone of confidence, or a defined proximity of one another). As will be recognized, this added level of security increases the likelihood that a notification/message is generated in a time-appropriate matter and/or that John is present at the delivery location (e.g., his mobile device and vehicle 100) to minimize the risk of releasing the item.

As will be recognized, any number and type of configurable/determinable parameters and configurable levels can be used with embodiments of the present invention. For example, FIG. 7 includes two additional examples of configurable levels: level 4 and level 5. In one example, level 4 requires that John's mobile device (e.g., registered smartphone or wearable), John's work location (e.g., or a desktop, television, smart thermostat, and/or the like at John's work), John's vehicle 100, and the item/shipment 103 being delivered be properly determined as being within the configurable/determinable parameters (e.g., being within a geofence, a zone of confidence, or a defined proximity of one another)—See FIGS. 12, 13, 16. Similarly, the level 5 example requires that John's mobile device (e.g., registered smartphone or wearable), John's work location (e.g., or a desktop, television, smart thermostat, and/or the like at John's work), John's vehicle 100, the item/shipment 103 being picked up or delivered, and a carrier mobile entity (e.g., user computing entity 115) be properly determined as being within the configurable/determinable parameters (e.g., being within a geofence, a zone of confidence, or a defined proximity of one another). As will be recognized, a variety of other approaches and techniques can be used to adapt to various needs and circumstances.

2. Location Based Notifications/Messages

In another embodiment, the carrier computing entity 105 (and/or other appropriately configured computing entities) can automatically provide (e.g., generate, queue, and/or transmit) one or more location-based notifications/messages based on the configurable/determinable parameters for a given account (messages to both consignors and/or consignees). For example, the carrier computing entity 105 (and/or other appropriately configured computing entities) can automatically provide the location-based notifications/messages to the electronic destination addresses regarding items that have been picked-up or delivered or have been attempted to be picked-up or delivered. As will be recognized, this may include generating, queuing, and/or transmitting an email message to a customer's email address, a text message to a customer's cellular phone, a notification/message to a designated application, and/or the like based on the configurable/determinable parameters.

In one embodiment, to provide the location-based notifications/messages, the carrier computing entity 105 (and/or a variety of other computing entities) may perform location-based monitoring or determinations based on the configurable/determinable parameters for a given account (Block 515 of FIG. 5). The location-based monitoring or determinations for entities and/or locations may be performed by an appropriate computing entity regularly, periodically, continuously, during certain time periods or time frames, on certain days, upon determining the occurrence of one or more configurable triggers/events, in response to requests, in response to determinations/identifications, combinations thereof, and/or the like. For example, an appropriate computing entity can monitor or determine/identify the locations of the various entities (e.g., vehicles 100, items 103, carrier computing entities 105, customer computing entities 110, user computing entities 115, establishment computing entities 116, location sensors 120, telematics sensors 125, information/data collection devices 130, and/or the like) and/or establishments/locations in response to certain triggers/events or requests. For example, the monitoring or determinations may only occur after items have been picked-up or delivered or have been attempted to be picked-up or delivered. In this example, the delivery or pick up of an item/shipment 103 or the attempted delivery or pick up of an item/shipment 103 may trigger the setting a monitoring flag, initiate the monitoring, initiate a determination, and/or the like. Similarly, in one embodiment, the delivery or pick up of an item/shipment 103 or the attempted delivery or pick up of an item/shipment 103 may trigger the automatic generation and queueing of one or more notifications/messages regarding the same. The notifications/messages can be automatically provided when the relevant configurable/determinable parameters are satisfied.

In one embodiment, the monitoring or determining/identifying can be initiated using a variety of different triggers. For examples, the triggers/events may include (a) a customer's vehicle or a designated carrier vehicle 100 being turned on or off; (b) a customer's vehicle 100 or a designated carrier vehicle 100 beginning to move; (c) a customer's vehicle 100 or a designated carrier vehicle 100 slowing to a stop; (d) an entity moving out of a geofenced area; (e) an entity moving into a geofenced area; (f) two or more entities being within a geofenced area or within a predetermined proximity of each other, and/or a variety of other triggers/events. As will be recognized, a variety of other approaches and techniques can be used to adapt to various needs and circumstances.

In one embodiment, if a configurable trigger/event is not detected or a request is not received, an appropriate computing entity (e.g., carrier computing entity 105, customer computing entity 110, user computing entity 115, establishment computing entity 116, and/or the like) can determine/identify whether a configurable time period has begun or ended. If the appropriate computing entity (e.g., carrier computing entity 105, customer computing entity 110, user computing entity 115, establishment computing entity 116, and/or the like) determines/identifies that the configurable time period has not begun or ended, the appropriate computing entity can continue monitoring for configurable triggers/events or requests. However, if the appropriate computing entity (e.g., carrier computing entity 105, customer computing entity 110, user computing entity 115, establishment computing entity 116, and/or the like) determines/identifies that the configurable time period has begun or ended, the appropriate computing entity can continuously monitor whether the relevant configurable/determinable parameters are satisfied. The monitoring may continue indefinitely, until the occurrence of one or more configurable triggers/events, until a configurable time period has elapsed, combinations thereof, and/or the like.

Generally, the locations of various establishments/locations and/or entities (carrier computing entities 105, customer computing entities 110, user computing entities 115, establishment computing entities 116, location sensors 120, telematics sensors 125, information/data collection devices 130, establishments/locations, and/or the like) can be monitored or determined/identified by any of a variety of computing entities—including carrier computing entities 105, customer computing entities 110, user computing entities 115, establishment computing entities 116, and/or the like. For example, the locations may be monitored or determined/identified with the aid of or in coordination with location-determining devices, location-determining aspects, location-determining features, location-determining functionality, location-determining sensors, and/or other location services. Such may include GPS; cellular assisted GPS; real time location systems or server technologies using received signal strength indicators from a Wi-Fi network); triangulating positions in connection with a variety of other systems, including cellular towers, Wi-Fi access points, and/or the like; and/or the like. Using these and other approaches and techniques, an appropriate computing entity (e.g., carrier computing entity 105, customer computing entity 110, user computing entity 115, establishment computing entity 116, establishments, and/or the like) can determine, for example, whether and when establishments/locations and/or entities are within a configurable/determinable distance/proximity from one another (Block 520 of FIG. 5).

In one embodiment, the configurable/determinable distance/proximity may be a distance, range, zone of confidence, proximity, geofence, tolerance, and/or similar words used herein interchangeably. For example, in one embodiment, the configurable/determinable distance/proximity may be plus or minus (±) a specific distance or range using a coordinate system (e.g., DD, DMS, UTM, and/or CARRIER). As will be recognized, a configurable/determinable distance/proximity may be in a variety of formats, such as degrees, minutes, seconds, feet, meters, miles (e.g., 3, 15, 30, or 50 feet), kilometers, and/or the like. Continuing with the above example, an appropriate computing entity may use a configurable/determinable distance/proximity of ±0.000001, ±0.000001 in the DD coordinate system (or configurable/determinable distance/proximities of ±0.000100, ±0.000100 or ±0.000010, ±0.000010) to determine/identify when configurable/determinable parameters for a customer are satisfied.

In the event establishments/locations and/or entities are within a configurable/determinable distance/proximity from each other (e.g., associated with one another) in accordance with the configurable/determinable parameters, an appropriate computing entity (e.g., carrier computing entity 105, customer computing entity 110, user computing entity 115, establishment computing entity 116, establishments, and/or the like) can make this determination/identification and indicate or provide an indication of the same. The indication may include device/entity information/data associated with the corresponding customer computing entity 110 and/or customer computing entity 110, such as the corresponding device identifiers and names. The indication may also include other information/data, such as the location at which the establishments/locations and/or entities became within the configurable/determinable distance/proximity of each other, the time at which the entities became within the configurable/determinable distance/proximity of each other, the type of event (e.g., picking up an item, delivering an item, and/or the like), and/or the like. In some embodiments, the appropriate computing entity can determine/identify the type of event. The appropriate computing entity (e.g., carrier computing entity 105, customer computing entity 110, user computing entity 115, establishment computing entity 116, establishments, and/or the like) can then store the information/data in one more records and/or in association with the account, subscription, program, and/or the like corresponding to the customer.

The appropriate computing entity can also provide location-based notifications/messages in accordance with the corresponding notification/message preferences (Block 520 of FIG. 5). In one embodiment, an appropriate computing entity can provide location-based notifications/messages when the configurable/determinable parameters are satisfied. For instance, when an appropriate computing entity can determines/identifies that the configurable/determinable parameters for an account are satisfied, the appropriate computing entity can automatically provide appropriate location-based queued notifications/messages and/or automatically generate, queue, and transmit appropriate location-based notifications/messages in compliance with the corresponding notification/message preferences. By way of example, in the level 2 example, assume John (carrying his mobile phone 110) arrives at his residence (34.3218697, −83.1239871) and enters a geofence or is within a configurable/determinable distance/proximity (e.g., ±0.000001, ±0.000001) of his residence. An appropriate computing entity can make such a determination/identification based on the monitoring (see FIG. 14). In response, an appropriate computing entity (e.g., carrier computing entity 105, user computing entity 115, and/or the like) can automatically provide appropriate location-based queued notifications/messages and/or automatically generate, queue, and transmit appropriate location-based notifications/messages.

Figure 17:
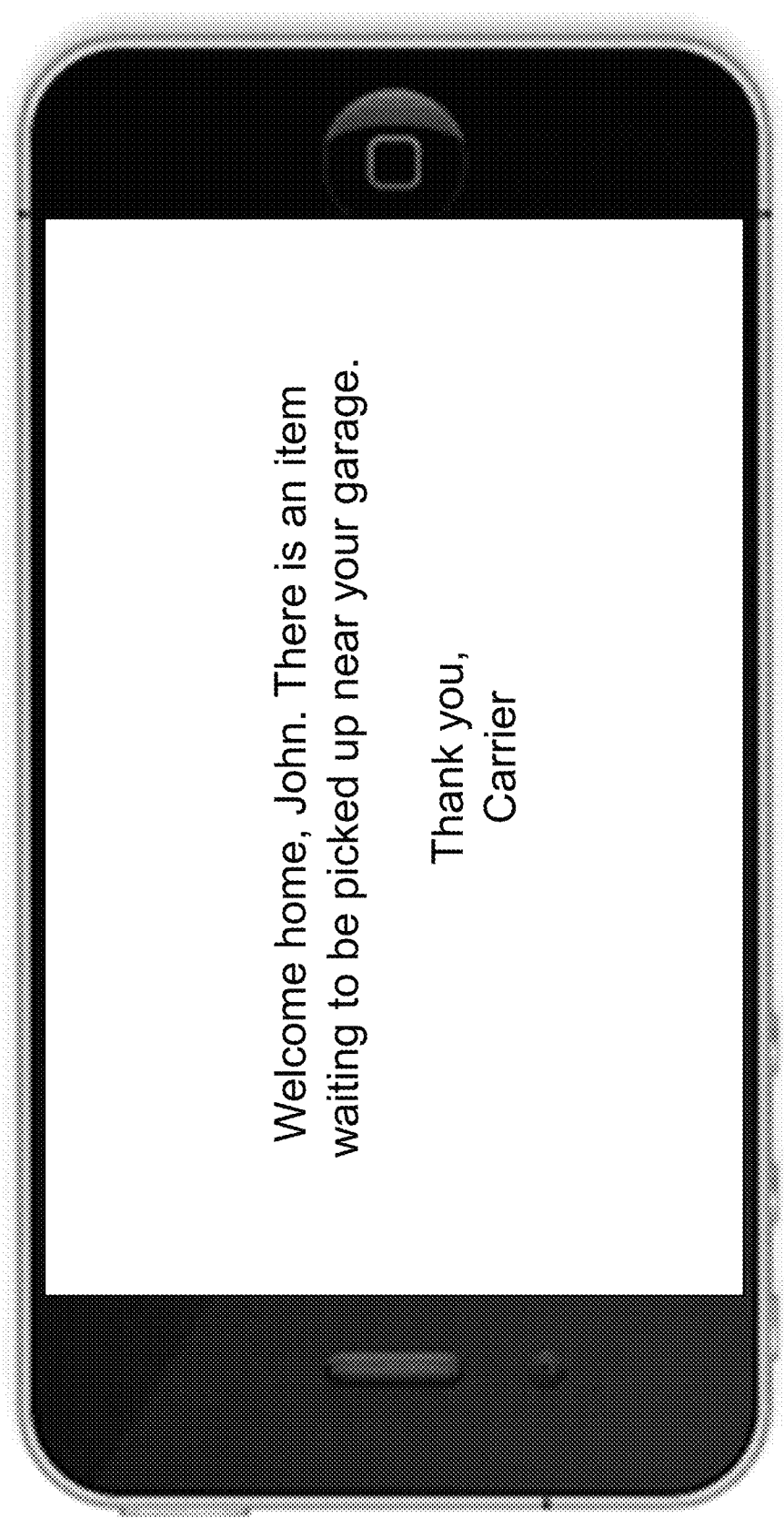
Figure 18:
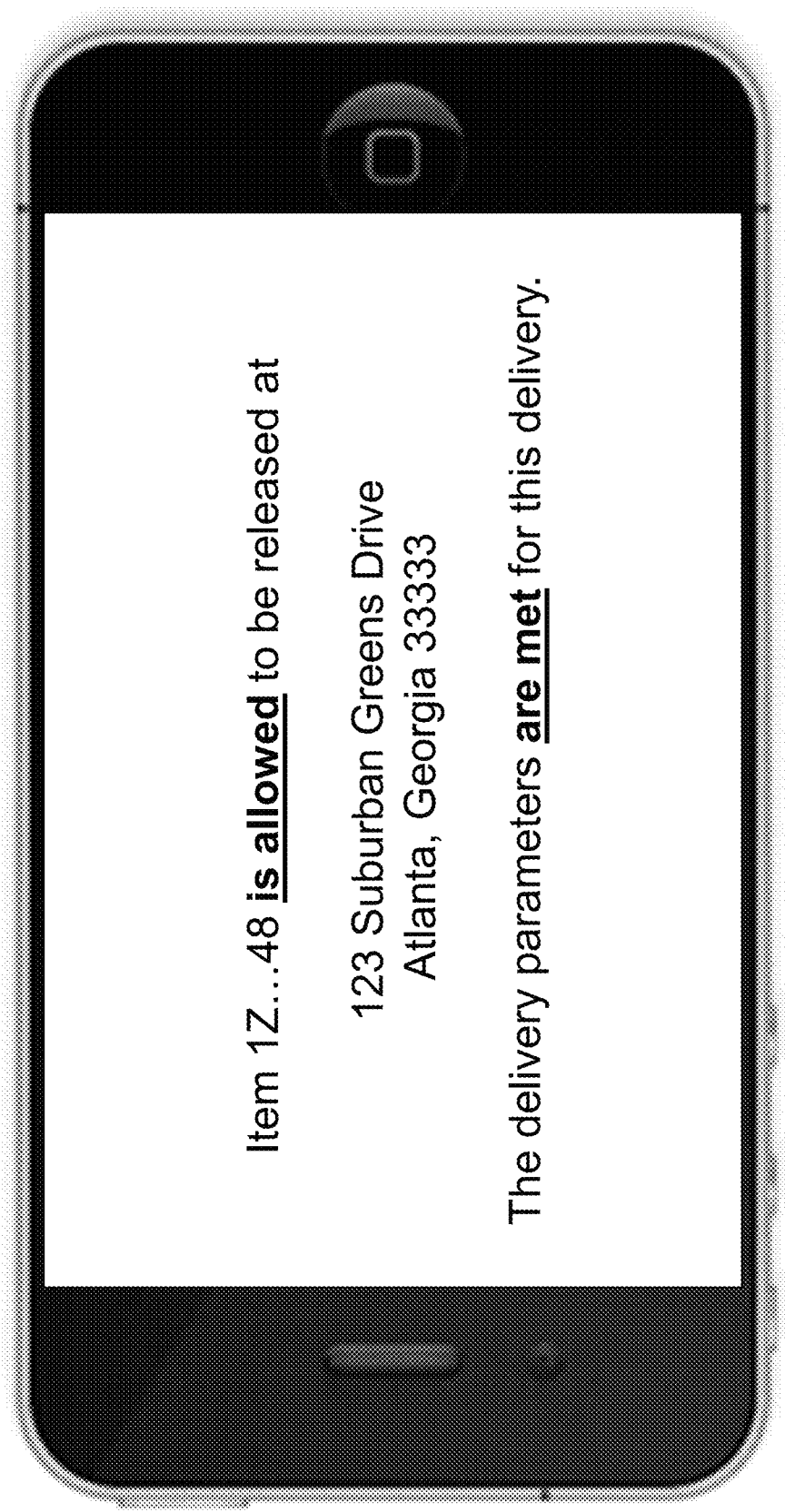
Figure 19:
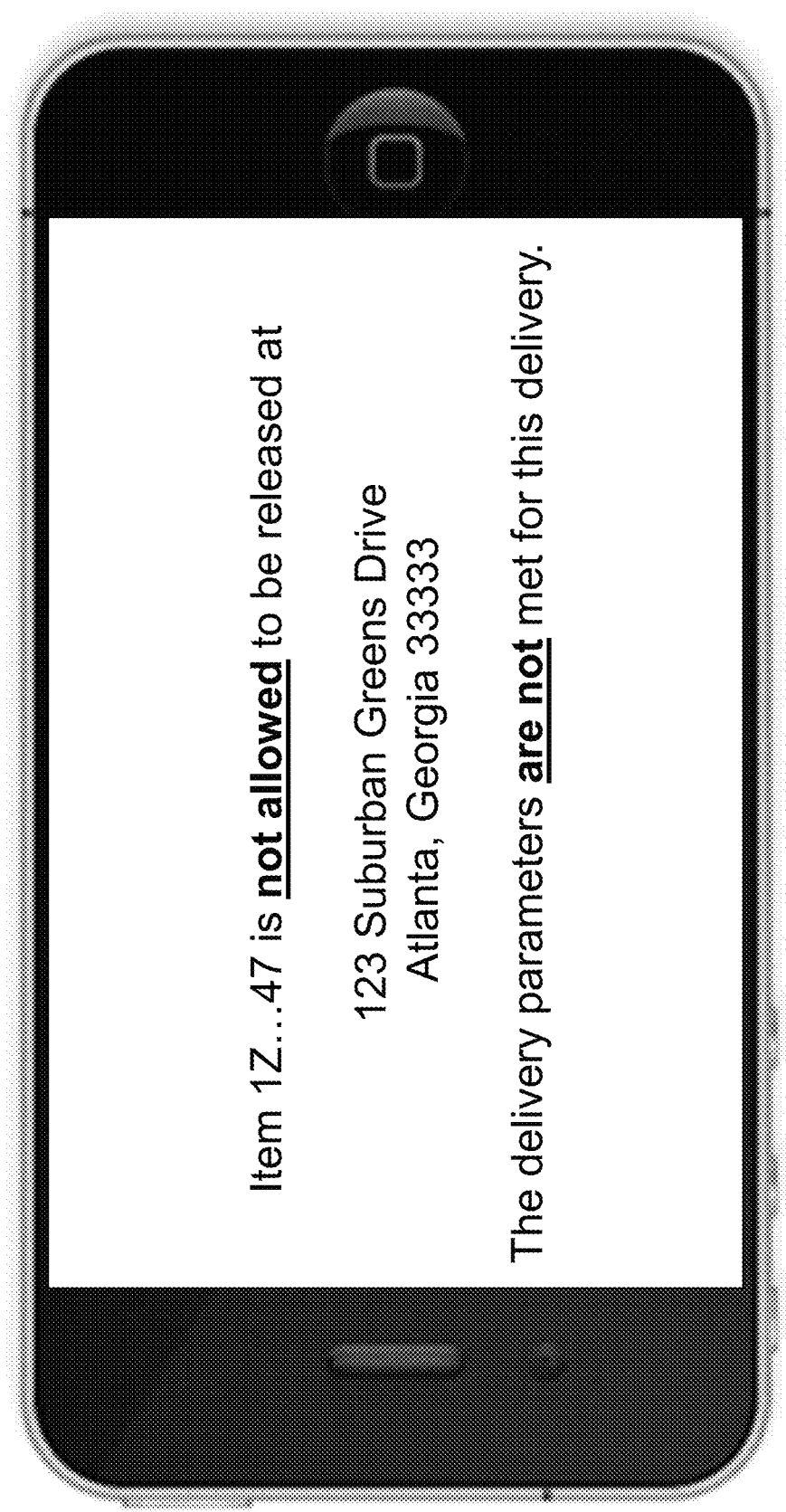

As will be recognized, a variety of types of notifications/messages can be provided. FIG. 17 shows an exemplary notification/message providing regarding a completed delivery of an item. For example, FIG. 17 shows a notification/message (e.g., a text message) that indicates where an item/shipment 103 has been delivered and can be retrieved by the customer. This location-based notification/message is provided to the customer in a time-appropriate manner (e.g., when he or she arrives at home or is in a physical location in which the item/shipment 103 to close to the customer). As will be recognized, the notification/message may include images, links, advertisements, and/or the like. For example, the images and links may provide information about the location of the item/shipment 103 (e.g., a picture of where the image is placed or open a map application that guides the customer to the item. As will be recognized, the notifications/messages can be provided in accordance with user notification/message preferences. For instance, the carrier computing entity 105 (and/or other appropriately configured computing entities) can automatically generate, queue, and/or transmit (e.g., provide) email notifications/messages to email addresses, text notifications/messages to cellular phones or applications, notifications/messages to designated applications, and/or the like.

In the level 3 example, assume John drives his vehicle 100 home and has his mobile phone 110 on his person when arrives at his residence (34.3218697, −83.1239871). Upon doing so, John (e.g., the vehicle 100 and mobile phone 110) enters a geofence or is within a configurable/determinable distance/proximity of his residence. An appropriate computing entity can make such a determination/identification based on the monitoring (see FIG. 15). In response, an appropriate computing entity (e.g., carrier computing entity 105, user computing entity 115, and/or the like) can automatically provide appropriate location-based queued notifications/messages and/or automatically generate, queue, and transmit appropriate location-based notifications/messages.

In the level 4 example, assume John drives his vehicle 100 to work and has his mobile phone 110 on his person when arrives at work (33.7869128,−84.3875602). Upon doing so, John (e.g., the vehicle 100 and mobile phone 110) enters a geofence or is within a configurable/determinable distance/proximity of his work and the item/shipment 103 that has been delivered there. That is, the work location, vehicle 100, mobile phone 110, and item/shipment 103 are all within a configurable/determinable distance/proximity from one another, within a geofenced, and/or the like. An appropriate computing entity can make such a determination/identification based on the monitoring (see FIG. 16). In response, an appropriate computing entity (e.g., carrier computing entity 105, user computing entity 115, and/or the like) can automatically provide appropriate location-based queued notifications/messages and/or automatically generate, queue, and transmit appropriate location-based notifications/messages.

In the level 5 example, assume John drives his vehicle 100 to work and has his mobile phone 110 on his person when arrives at work (33.7869128,−84.3875602). Upon doing so, John (e.g., the vehicle 100 and mobile phone 110) enters a geofence or is within a configurable/determinable distance/proximity of his work and the item/shipment 103 and the carrier pick-up/delivery person (operating a user computing entity 115) delivering the item. That is, the work location, vehicle 100, mobile phone 110, item, and user computing entity are all within a configurable/determinable distance/proximity from one another, within a geofenced, and/or the like. An appropriate computing entity can make such a determination/identification based on the monitoring (not shown). In response, an appropriate computing entity (e.g., carrier computing entity 105, user computing entity 115, and/or the like) can automatically provide appropriate location-based queued notifications/messages and/or automatically generate, queue, and transmit appropriate location-based notifications/messages.

3. Location Based Events

In one embodiment, the carrier computing entity 105 (and/or other appropriately configured computing entities) can automatically determine whether specific events/actions are allowed or disallowed or trigger specific events/actions (e.g., initiating shipment of an item, initiating movement of an item, generating shipping data, initiating payment, and/or the like) based on the defined configurable/determinable parameters for a given account and/or event. As noted, such events can include allowing or disallowing the pick-up or delivery of items, allowing or disallowing driver release of items, and/or the like. Correspondingly, responsive to such determinations, the carrier computing entity 105 (and/or other appropriately configured computing entities) can automatically provide notifications/messages to a carrier pick-up/delivery person regarding the same (See FIGS. 18 and 19). For example, the carrier computing entity 105 can provide messages/notifications to a user computing entity 115 (operated by a carrier pick-up/delivery person) regarding whether he or she is allowed or disallowed to deliver or pick up an item/shipment 103 based on the configurable/determinable parameters. In other contexts, the notifications/messages can comprise an instruction to carry out or initiate an event/actions, such as an instruction to initiate shipment of an item, initiate movement of an item, generate shipping data, initiate payment, and/or the like.

In one embodiment, the carrier computing entity 105 (and/or a variety of other computing entities) may perform location-based determinations based on the configurable/determinable parameters (e.g., security, time, weather, temperature, altitude, national security level, and/or the like) for a given account (Blocks 525, 530, 535 of FIG. 5). The location-based determinations for entities and/or locations may be performed by an appropriate computing entity upon determining the occurrence of one or more configurable triggers/events, in response to requests, in response to determinations/identifications, combinations thereof, and/or the like. In one example, the determining/identifying can be initiated using a variety of different triggers—(a) a designated carrier vehicle 100 being turned on or off; (b) a designated carrier vehicle 100 beginning to move; (c) a designated carrier vehicle 100 slowing to a stop; (d) an entity moving out of a geofenced area; (e) an entity moving into a geofenced area; and/or a variety of other triggers/events. In one embodiment, the determining/identifying can be initiated in response to a request or determination (Block 525 of FIG. 5), such as (a) a scan of an item/shipment 103 at a pick-up or delivery location (e.g., a carrier pick-up/delivery person operating a user computing entity 115 to scan an item/shipment 103 and/or request instructions from the carrier computing entity 105); (b) a determination that an item/shipment 103 will be delivered in the next 5 or 10 minutes (configurable time period); (c) a determination that an item/shipment 103 is among the next 5 or 7 items 103 to be delivered (configurable number); and/or a variety of other requests or determinations. As will be recognized, a variety of other approaches and techniques can be used to adapt to various needs and circumstances. Regardless of how the determination is initiated, an appropriate computing entity can determine whether the corresponding configurable/determinable parameters are satisfied.

Generally, the locations of various establishments/locations and/or entities (carrier computing entities 105, customer computing entities 110, user computing entities 115, establishment computing entities 116, location sensors 120, telematics sensors 125, information/data collection devices 130, establishments/locations, and/or the like) can be determined/identified by any of a variety of computing entities (Block 530 of FIG. 5). For example, the locations may be determined/identified with the aid of or in coordination with location-determining devices, location-determining aspects, location-determining features, location-determining functionality, location-determining sensors, and/or other location services. Such may include GPS; cellular assisted GPS; real time location systems or server technologies using received signal strength indicators from a Wi-Fi network); triangulating positions in connection with a variety of other systems, including cellular towers, Wi-Fi access points, and/or the like; and/or the like. Using these and other approaches and techniques, an appropriate computing entity (e.g., carrier computing entity 105, customer computing entity 110, user computing entity 115, establishment computing entity 116, establishments, and/or the like) can determine, for example, whether and when establishments/locations and/or entities are within a configurable/determinable distance/proximity (e.g., relative space) from one another.

In the event establishments/locations and/or entities are within a configurable/determinable distance/proximity from each other (e.g., associated with one another) in accordance with the configurable/determinable parameters, an appropriate computing entity (e.g., carrier computing entity 105, user computing entity 115) can make this determination/identification and indicate or provide a notification/message regarding the same. The following examples are provided in the context of a carrier pick-up/delivery person performing a delivery of items. For instance, in the examples, a carrier pick-up/delivery person (operating a user computing entity 105) can scan an item, read an item, interrogate an item, or communicate with an item. The scanning, reading, interrogating, or communicating can generate a request to allow or disallow an event, such as the pick-up or delivery of an item. In certain embodiments, the event type is automatically determined based on context (e.g., by the item/shipment 103 being scanned by a carrier pick-up/delivery person that only delivery and pick up items). In other embodiments, the event type is input by a carrier pick-up/delivery person via the user computing entity 115 (e.g., delivery, pick-up, delivery at garage, pick-up at residence, and/or the like), which can be included in the request.

In the level 2 example, assume a carrier pick-up/delivery person is attempting to drop off an item/shipment 103 at John's garage for delivery. As part of the process, the carrier pick-up/delivery person scans the item/shipment 103 (or the item/shipment is read, interrogated, communicated with, and/or the like) using a user computing entity 115, which generates a request to the carrier computing entity 105 to allow or disallow the event. As noted, the event type to be allowed or disallowed can be automatically determined or input by the carrier pick-up/delivery person and included as part of the request. In response to the request, an appropriate computing entity can determine whether the registered entities and/or locations satisfy the corresponding configurable/determinable parameters. In this example, if John's mobile phone 110 is within a configurable/determinable distance/proximity of his residence, the appropriate computing entity will allow the event and provide a notification/message to the user computing entity 115 regarding the same (see FIG. 18). Otherwise, the appropriate computing entity will disallow the event and provide a notification/message to the user computing entity 115 regarding the same (see FIG. 19).

In the level 3 example, assume a carrier pick-up/delivery person is attempting to drop off an item/shipment 103 at John's front door for delivery. As part of the process, the carrier pick-up/delivery person scans the item/shipment 103 using a user computing entity 115, which generates a request to the carrier computing entity 105 to allow or disallow the event. In response to the request, an appropriate computing entity can determine whether the registered entities and/or locations satisfy the corresponding configurable/determinable parameters. In this example, if John's mobile phone 110 and vehicle 100 are within a configurable/determinable distance/proximity of his residence, the appropriate computing entity will allow the event and provide a notification/message to the user computing entity 115 regarding the same (see FIG. 18). Otherwise, the appropriate computing entity will disallow the event and provide a notification/message to the user computing entity 115 regarding the same (see FIG. 19). Similar approaches can be carried out for level 4 or level 5, and any other configurable level with corresponding configurable/determinable parameters. As will be recognized, a variety of other approaches and techniques can be used to adapt to various needs and circumstances. Also, as noted, in other contexts, the notifications/messages can comprise an instruction to carry out or initiate an event/actions, such as an instruction to initiate shipment of an item, initiate movement of an item, generate shipping data, initiate payment, and/or the like. As will be recognized, a variety of other approaches and techniques can be used to adapt to various needs and circumstances.

IV. ILLUSTRATIVE EXAMPLES

1. Home or ADL Delivery Location-Based Alerts

In various embodiments, a location-based delivery notification/message may be provided to a customer. Such a location-based delivery notification/message may address the problem of insuring the customer has the information needed to retrieve the item from the delivery location. For example, if the item was delivered to the back door of the customer's home and the customer enters his or her home through the front door, the customer might not notice the item at the back door. However, the notification/message may inform the customer that the item was delivered to the back door, thereby alerting the customer to check the back door. In another example, if the item is delivered to a locker, the notification/message may include a locker number and combination needed to retrieve the item from the locker. Thus, in various embodiments, the location-based delivery notification/message may concisely and timely provide the customer with information needed to retrieve the item from the delivery location.

Figure 20:
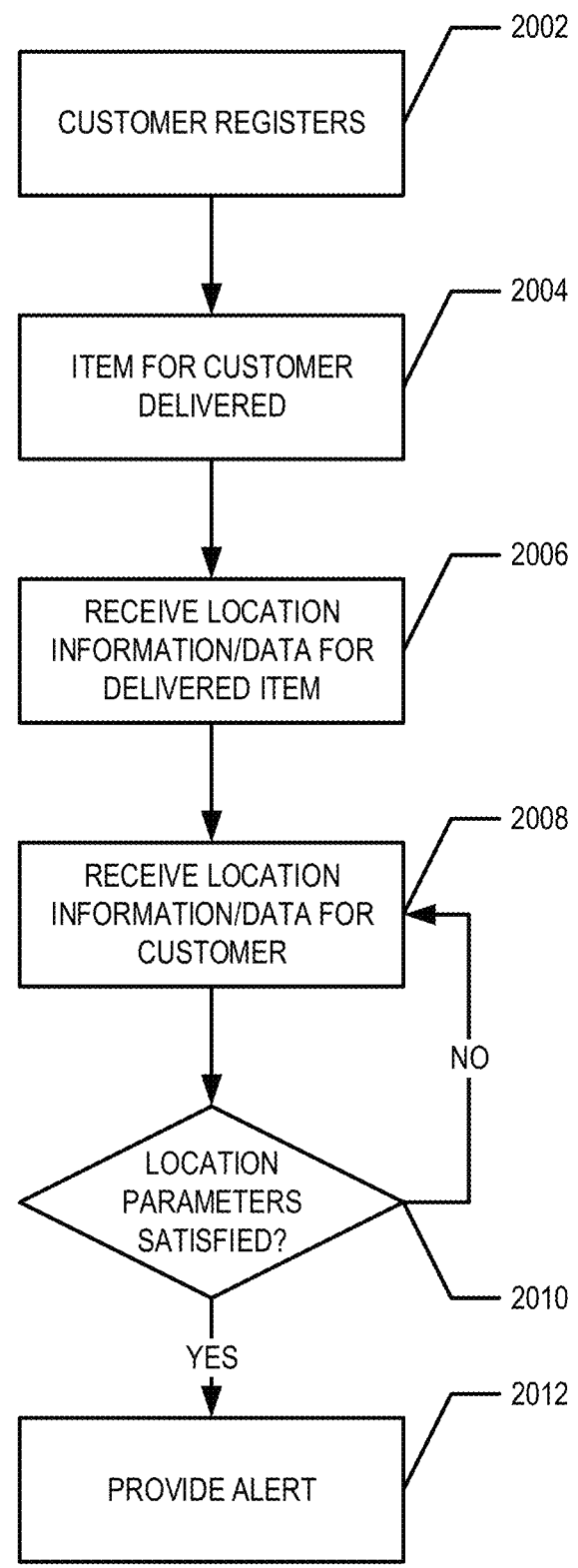

FIG. 20 is a flowchart illustrating various operations and procedures that may be completed to provide a location-based delivery notification/message to a customer who has selected to turn on home delivery location-based alerts and/or ADL location-based alerts. Starting at step 2002, the customer registers and/or is registered as describes above. During the registration process, and/or at a later point in time, the customer selects to receive and/or is enrolled to receive home delivery location-based alerts and/or ADL location-based alerts.

At step 2004, an item/shipment is delivered to the customer either to the customer's address (e.g., a home address) or an ADL. At step 2006, item/shipment location information/data is received. For example, a carrier computing entity 105 may receive item/shipment location information/data. The item/shipment location information/data indicates a physical location of the item/shipment at the time item/shipment was delivered and/or shortly thereafter. The item/shipment location information/data may be determined and provided by the item/shipment (e.g., if the item/shipment is a connected item), or may be the known location of the location where the item/shipment was delivered (e.g., the customer's house, condo, apartment, ADL locker, and/or the like), the location of the user computing entity 115 used to scan the item/shipment upon delivery of the item/shipment at approximately the time when the item/shipment was scanned for delivery, the location of a vehicle 100 that was used to transport the item/shipment to the delivery location (e.g., the delivery vehicle 100) at approximately the time when the item/shipment was delivered (e.g., when the item/shipment was scanned for delivery), and/or the like.

At step 2008, consignee location information/data is received. For example, a carrier computing entity 105 may receive consignee location information/data. For example, consignee location information/data may be configured to indicate the current physical location of the customer who is the consignee and/or intended recipient for the item/shipment. For example, the consignee location information/data may be determined and/or provided by the customer computing entity 110, the customer's vehicle 100, and/or the like.

At step 2010, it is determined if the parameters for providing the location-based alert are satisfied. For example, a carrier computing entity 105 may determine if the parameters for providing the location-based alert are satisfied. For example, if parameters for providing the location-based alert may be that the consignee location information/data indicates that the customer has entered and/or is located within a geofenced area about the item, within a predetermined radius of the item, within a predetermined proximity of the item, and/or the like. In various embodiments, the proximity parameters for a home delivery location-based alert may be smaller than for an ADL delivery location-based alert. For example, for a home delivery, the customer may want to be notified when she pulls into her driveway, parking garage, is within 100 or 50 feet of the item, and/or the like. In another example, for an ADL delivery, the customer may want to be notified when she is within two miles, one mile, half a mile, or the like of the ADL location to which the item/shipment was delivered.

If the parameters for providing the location-based alert are satisfied, then at step 2012, a home or ADL delivery location-based alert is provided, as appropriate. For example, a carrier computing entity 105 may generate and provide the home or ADL delivery location-based alert. For example, a home delivery location-based alert may indicate that the item/shipment was left in the garage, by the front door, by the back door, on the porch, with the building concierge, at the leasing/management office, and/or the like. In another example, an ADL delivery location-based alert may indicate where the ADL location is (e.g., your item/shipment has been delivered to the CVS at 125 West St.), a locker number, an access/authentication code for accessing a locker or receiving the item, and/or the like. As described above, a home or ADL delivery location-based alert may be provided to an electronic address indicated in the customer profile.

In various embodiments, a shipper may request to track an item. When the item/shipment is delivered, the tracking information/data provided to the shipper may indicate that the item/shipment was delivered. In various embodiments, the tracking information/data accessible to the shipper may indicate that a delivery location-based alert was provided to the customer notifying the customer of the delivery of the item. In various embodiments, such tracking information/data may be accessible to shippers based on a subscription basis and/or the like.

2. Mobile Delivery Location-Based Alerts

In an example scenario, a customer may be out running errands and may not be at his or her home to receive an item. Thus, if, for example, an in-person signature is needed for delivery of the item, the item may not be able to be delivered during the delivery attempt. However, the item and the customer may be in close proximity at some point and the item may be able to be delivered to the customer at a location other than the delivery address (e.g., the customer's home). Thus, example embodiments of the present invention may therefore address the problem of providing a customer with timely notifications/messages regarding convenient delivery options in order to facilitate efficient delivery of the item to the customer.

Figure 21:
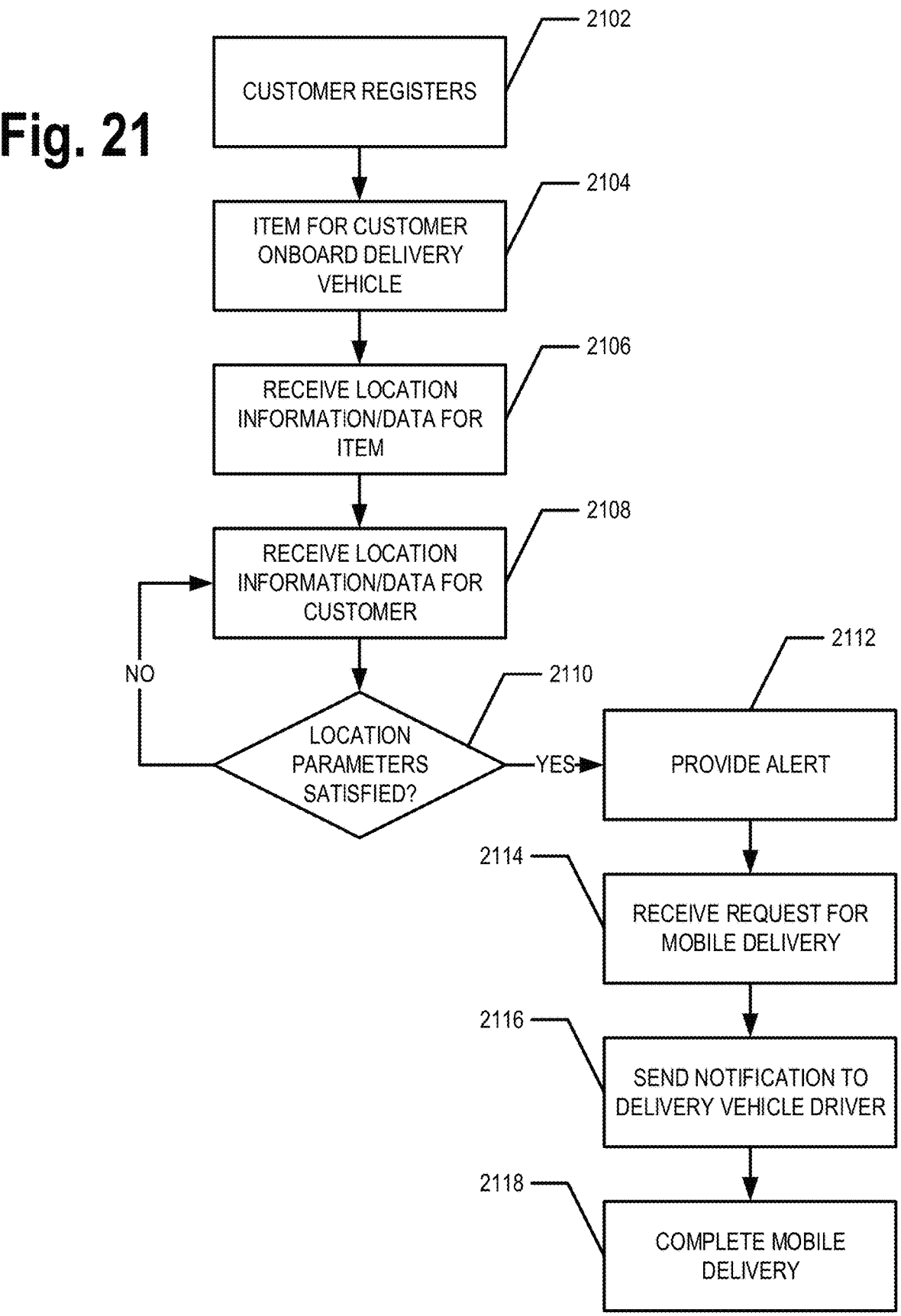
Figure 22:
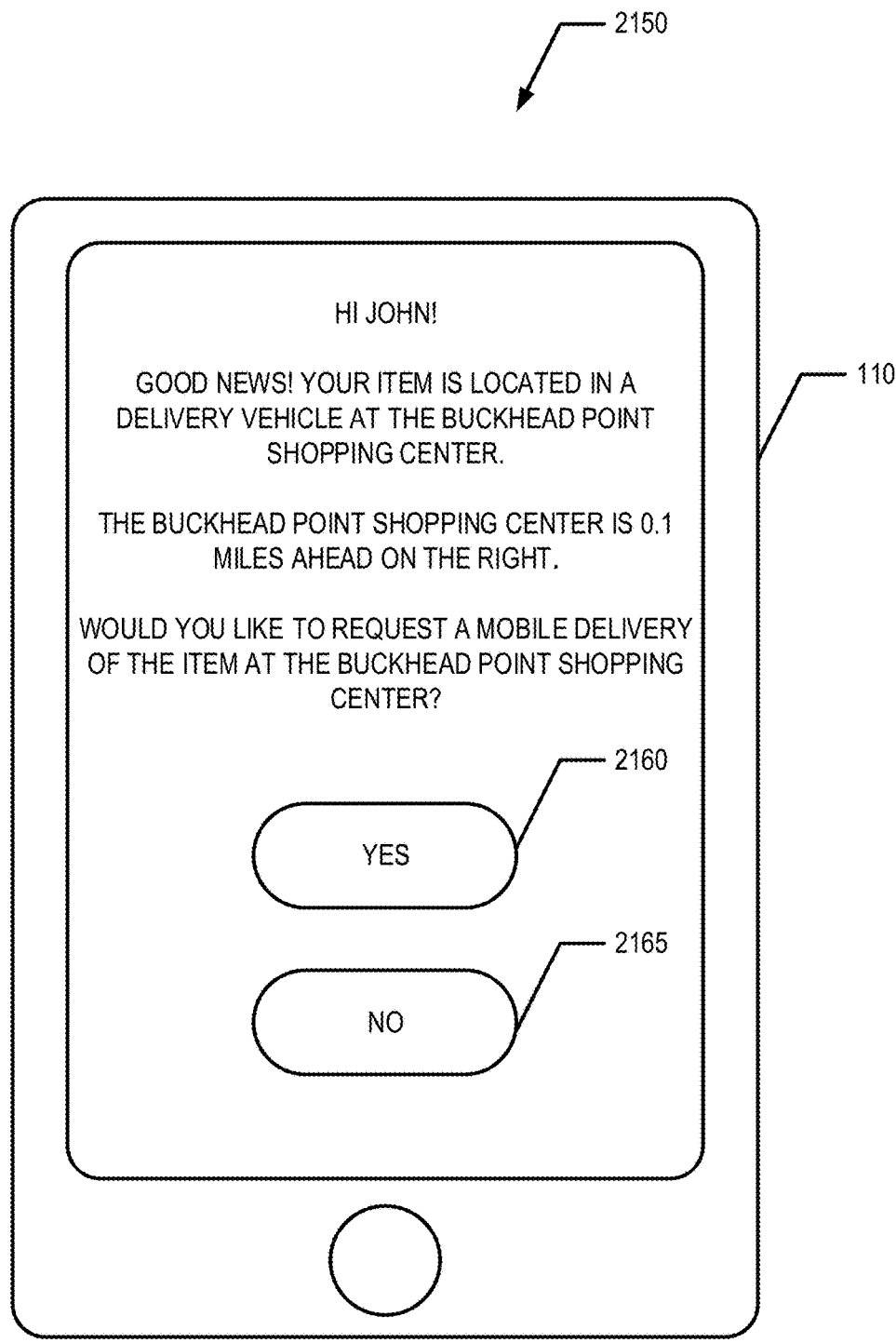

FIG. 21 illustrates a flowchart of processes and procedures that may be used facilitate a mobile delivery of an item/shipment by using a mobile delivery location-based alert. In example embodiments, a mobile delivery may occur when a customer who is a consignee/intended recipient of an item/shipment is within a predetermined distance or geographic region about a delivery vehicle 100 having the item/shipment onboard. For example, the customer may be within a 1 minute drive or in the same parking lot as a delivery vehicle 100 having an item/shipment onboard for which the customer is the consignee/intended recipient. The mobile delivery may be facilitated as described below.

Starting at step 2102, the customer registers and/or is registered as describes above. During the registration process, and/or at a later point in time, the customer selects to receive and/or is enrolled to receive mobile delivery location-based alerts. At step 2104, an item/shipment for which the customer is the consignee/intended recipient is loaded into a delivery vehicle 100 to be delivered to an address associated with the customer.

At step 2106, item/shipment location information/data is received. For example, the carrier computing entity 105 may receive item/shipment location information/data. In various embodiments, the item/shipment location information/data may indicate the current physical location of the item/shipment and/or the expected current physical location of the item/shipment (e.g., based on location of a delivery vehicle 100 on which the item/shipment was loaded and/or the like). For example, the item/shipment itself may provide and/or determine the item/shipment location/information. In another example, delivery vehicle 100 location information/data may be determined by a delivery vehicle 100 and associated with the item/shipment based on the item/shipment having been loaded onto the delivery vehicle 100 for delivery to the consignee/intended recipient of the item. In yet another example, user computing entity 115 location information/data may be determined by a user computing entity 115 and associated with the item/shipment based on the delivery person associated with the user computing entity 115 being charged with delivering the item/shipment to the consignee/intended recipient.

At step 2108, consignee location information/data is received. For example, the carrier computing entity 105 may receive consignee location information/data. For example, the consignee location information/data may indicate the current physical location of the customer who is the consignee and/or intended recipient for the item/shipment. In various embodiments, the consignee location information/data may be determined and/or provided by the customer computing entity 110, the customer's vehicle 100, and/or the like.

At step 2110, it is determined if the parameters for providing the location-based alert are satisfied. For example, a carrier computing entity 105 may determine if the parameters for providing the location-based alert are satisfied. For example, the parameters for providing the location-based alert may be that the consignee location information/data indicates that the customer has entered and/or is located within a geofenced area about the item, within a predetermined radius of the item, within a predetermined proximity of the item, and/or the like. For example, the customer may be within a one minute drive of the item, in the same parking lot as the item, at an establishment served by the parking lot in which the item/shipment is located, on the same road segment as the item/shipment (e.g., on Main St. between $1^{st}$ Ave and $5^{th}$ Ave), and/or the like.

In various embodiments, determining if the parameters of providing the location-based alert may comprise requesting and/or receiving additional consignee location information/data. For example, the consignee location information/data may be received from the customer's mobile phone and the additional consignee location information/data may then be requested and/or received from the customer's wearable device, vehicle, tablet, and/or other mobile device. In some embodiments, the additional consignee location information/data may be historical consignee location information/data. For example, it may be determined if historical consignee location information/data indicates that the customer has a history of being in the vicinity of the current physical location indicated by the consignee location information/data. In various embodiments, the historical consignee location information/data may be stored by a carrier computing entity 105 and/or requested and/or received from a third party (e.g., a mobile phone service provider). In another example, the additional consignee location information/data may be based on one or more addresses stored in association with the customer profile corresponding to the customer. For example, the customer profile corresponding to the customer may include a home address and a work address for the customer. It may then be determined if the consignee location information/data indicates that the customer is currently located within a predetermined radius, proximity, and/or geofence about the home address and/or work address stored in association with the customer profile corresponding to the customer.

Figure 23:
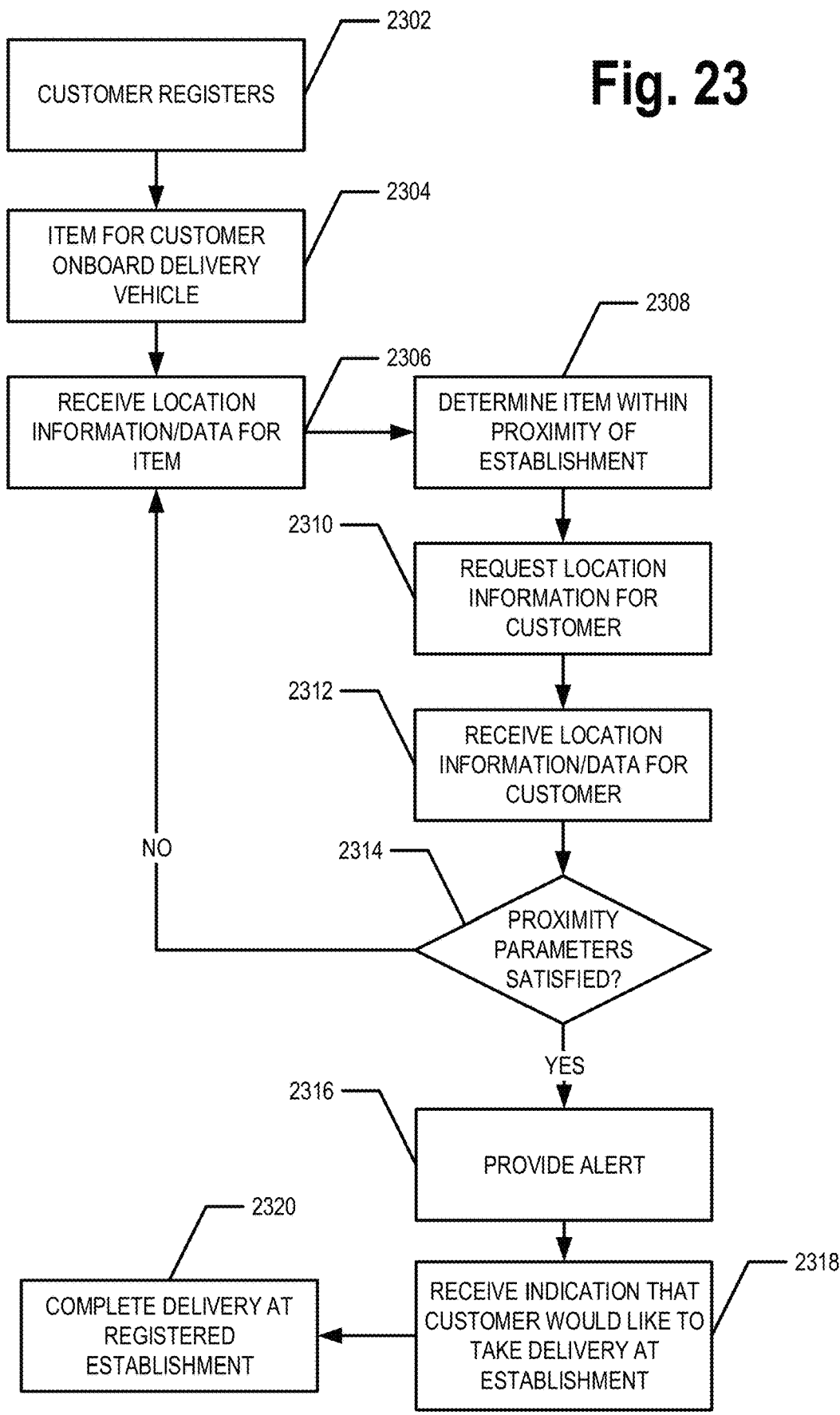

If, at step 2110, it is determined that the parameters for providing the location-based alert are satisfied based on the item/shipment location information/data, consignee location information/data and/or additional consignee location information/data, then a mobile delivery location-based alert may be generated and provided at step 2112. For example, a mobile delivery location-based alert may be generated and/or provided by the carrier computing entity 105. For example, the customer computing entity 110 may receive and/or display the mobile delivery location-based alert. The delivery vehicle driver and/or other carrier personnel may also be provided (e.g., via a user computing entity 115) with the mobile delivery location-based alert and/or a notification that a mobile delivery location-based alert was provided to a customer. In various embodiments, the mobile delivery location-based alert may indicate to the customer that the item/shipment is located nearby and provide a proposed location for the mobile delivery (e.g., the providing of the item/shipment to the customer). The mobile delivery location-based alert may further provide the customer with a mechanism to request or reject the mobile delivery. For example, FIG. 23 provides an example mobile delivery location-based alert 2150 that may be displayed to the customer by, for example, the customer computing entity 110. The mobile delivery location-based alert 2150 advises the customer regarding the proposed mobile delivery location, how to get to the proposed mobile delivery location, and asks if the customer would like to request the mobile delivery. In various embodiments, the customer may be asked to suggest a mobile delivery location. If the customer provides input (e.g., via the user interface of the customer computing entity 110) selecting the yes button 2160 within a predetermined time period (e.g., within 3 minutes of when the alert was provided) or before leaving a predetermined geographic area (e.g., before the customer drives past the Buckhead Center Shopping Center), the delivery vehicle driver and/or other carrier personnel may be informed (e.g., via the user computing entity 115) that the mobile delivery of the item/shipment has been requested. If the user selects the no button 2165 or does not select the yes button 2160 within the predetermined time period or before leaving the predetermined geographic area, the mobile delivery is considered rejected. The delivery vehicle driver and/or other carrier personnel may be informed (e.g., via the user computing entity 115) that the customer has rejected the mobile delivery of the item/shipment and delivery of the item/shipment will proceed as previously scheduled.

As noted, if input provided by the customer (e.g., via the customer computing entity 110) is received within the predetermined time period and/or while the customer is still within the predetermined geographic area, a notification is provided to the delivery vehicle driver and/or other carrier personnel (e.g., via a user computing entity 115), at steps 2114 and 2116. For example, the carrier computing entity 105 may receive an indication that the customer would like to receive mobile delivery of the item. In response thereto, the carrier computing entity 105 may generate and/or provide a notification providing the delivery vehicle driver and/or other carrier personnel with the information required to perform the mobile delivery. For example, the notification may include a tracking number and/or other identifying information/data for the item, information/data identifying the customer, the mobile delivery location, and/or the like. In some embodiments, the delivery vehicle driver and/or other carrier personnel may be able to turn down the mobile delivery request.

At step 2118, the mobile delivery is completed. For example, the customer may meet the delivery vehicle driver at the delivery vehicle 100 in the parking lot of the Buckhead Point Shopping Center, the delivery vehicle driver may confirm the identity of the customer (e.g., request to see an ID, request a confirmation code that was provided to the customer, and/or the like), and provides the item/shipment to the customer.

In some embodiments, an item/shipment need not be on a delivery vehicle for delivery for a mobile delivery location-based alert to be issued. For example, in one embodiment, the item/shipment may be located at a carrier storefront and/or an establishment associated with the carrier. When the customer is within a predetermined proximity of the item, the customer may be provided with the mobile delivery location-based alert.

3. Establishment Location-Based Alerts

In an example scenario, a customer may be meeting friends, family, or business colleagues for coffee and may not be at his or her home to receive an item. Thus, if, for example, an in-person signature is needed for delivery of the item, the item may not be able to be delivered during the delivery attempt. However, the item may be in close proximity to the coffee shop where the customer is having his or her coffee meeting. Thus, the item may be able to be delivered to the customer at the coffee shop more efficiently than to the delivery address (e.g., the customer's home). Thus, example embodiments of the present invention may therefore address the problem of providing a customer with timely notifications/messages regarding convenient delivery options in order to facilitate efficient delivery of the item to the customer. Moreover, in example embodiments where the establishment is able to automatically confirm the presence of the customer at the establishment and/or the customer's presence at or in the vicinity of the establishment may be otherwise confirmed, the present invention may address the problem of providing a customer with timely notifications regarding convenient delivery options in order to facilitate efficient and secure delivery of the item to the customer.

FIG. 23 illustrates a flowchart of processes and procedures that may be used facilitate delivery of an item/shipment at an establishment. For example, establishments may register with a carrier to allow customers to take delivery of items while at the establishment. For example, an establishment may be a coffee house, a restaurant, a bookstore, or other business or location a customer may visit.

Starting at step 2302, the customer registers and/or is registered as described above. During the registration process, and/or at a later point in time, the customer selects to receive and/or is enrolled to receive establishment location-based alerts. At step 2304, an item/shipment for which the customer is the consignee/intended recipient is loaded into a delivery vehicle 100 to be delivered to an address associated with the customer.

At step 2306, item/shipment location information/data is received. For example, the carrier computing entity 105 may receive item/shipment location information/data. In various embodiments, the item/shipment location information/data may indicate the current physical location of the item/shipment and/or the expected current physical location of the item/shipment (e.g., based on location of a delivery vehicle 100 on which the item/shipment was loaded and/or the like). For example, the item/shipment itself may provide and/or determine the item/shipment location/information. In another example, delivery vehicle 100 location information/data may be determined by a delivery vehicle 100 and associated with the item/shipment based on the item/shipment having been loaded onto the delivery vehicle 100 for delivery to the consignee/intended recipient of the item. In yet another example, user computing entity 115 location information/data may be determined by a user computing entity 115 and associated with the item/shipment based on the delivery person associated with the user computing entity 115 being charged with delivering the item/shipment to the consignee/intended recipient.

At step 2308, it is determined that the item/shipment location information/data indicates that the item/shipment is located within a first configurable distance of an establishment. For example, the item/shipment may be located within a predetermined proximity from and/or within a predetermined geofence about an establishment (e.g., a registered establishment). For example, the carrier computing entity 105 may determine that the item/shipment location information/data indicates that the item/shipment is located within a predetermined proximity of and/or within a predetermined geofence about an establishment. Identifying that the item is located within a first configurable distance of the establishment may ensure that the carrier may efficiently deliver the item to a customer at the establishment if the customer is present at the establishment.

At step 2310, after determining that the item/shipment is located within a first configurable distance of an establishment (e.g., a predetermined proximity of and/or within a predetermined geofence about an establishment), or possibly in response thereto, first consignee location information/data is requested for the customer who is the consignee/intended recipient for the item. For example, the carrier computing entity 105 may request first consignee location information/data for the customer who is the consignee/intended recipient for the item.

In various embodiments, the first consignee location information/data may be establishment confirmation of the presence of the customer being within the second configurable distance of the establishment. For example, establishment confirmation of the customer being within the second configurable distance of the establishment may be requested. For example, it may be determined if the user recently (e.g., within the last five minutes, half an hour, hour, or the like) "checked-in" at the establishment on a social media platform. In various embodiments, a registered establishment may have a sensor (e.g, a beacon or other indoor positioning system) in communication with an establishment computing entity 116. For example, the carrier computing entity 105 may ask an establishment computing entity 116 associated with the establishment if the customer is within the establishment. For example, a customer's customer computing entity 110 may be detected by a sensor (e.g., a beacon) within the establishment and the sensor may provide the information identifying the customer computing entity 110 to the establishment computing entity 116. The establishment computing entity 116 may then provide the carrier computing entity 105 a confirmation of the customer being within the establishment. In another embodiment, the establishment computing entity 116 may determine if a gift card, points card, debit card, or credit card issued to the customer has been used at the establishment in the past 5 minutes, 10 minutes, 30 minutes, hour, and/or the like and may provide confirmation of the customer's presence at the establishment based thereon.

At step 2312, the first consignee location information/data is received. For example, the carrier computing entity 105 may receive first consignee location information/data. For example, the first consignee location information/data may indicate that the customer is or is not present within the second configurable distance of the establishment. In various embodiments, the first consignee location information/data may be determined and/or provided by the establishment computing entity 116.

At step 2314, it is determined if the parameters for providing the location-based alert are satisfied. For example, a carrier computing entity 105 may determine if the parameters for providing the location-based alert are satisfied. For example, it may be determined if the customer is at the establishment, in a parking lot that serves the establishment, and/or the like.

In various embodiments, determining if the parameters of providing the location-based alert may comprise requesting and/or receiving additional consignee location information/data. For example, second consignee location information/data may be requested and/or received. For example, the parameters for providing the location-based alert may require that at least first consignee location information/data and second consignee location information/data be processed and/or analyzed to determine and/or confirm that the customer who is the consignee and/or intended recipient for the item is located within a second configurable distance of the establishment (e.g., within a radius, within a geofence, and/or the like). For example, the first configurable distance may be defined as a particular distance about the establishment. In various embodiments, the first consignee location information/data may be received from the establishment computing entity 116, and/or the like. An example of second consignee location information/data may be a current location of the customer determined and/or provided by a customer computing entity 110 and/or a customer vehicle 100. For example a location sensor of the customer computing entity 110 and/or a customer vehicle 100 may determine the location (e.g., determine geopositional information/data) of the customer computing entity 110 and/or the customer vehicle and provide the determined location through a communication interface thereof. For example, the second consignee location information/data may be received from the customer's mobile phone and the additional consignee location information/data may then be requested and/or received from the customer's wearable device, vehicle, tablet, and/or other mobile device. In some embodiments, the second consignee location information/data may be historical consignee location information/data. For example, it may be determined if historical consignee location information/data indicates that the customer has a history of visiting the establishment, being in the vicinity of the establishment, and/or the like. In various embodiments, the historical consignee location information/data may be stored by a carrier computing entity 105 and/or requested and/or received from a third party (e.g., a mobile phone service provider, social network platform). For example, it may be determined if the customer has previously "checked-in" at the establishment on a social media platform. In another example, the second consignee location information/data may be based on one or more addresses stored in association with the customer profile corresponding to the customer. For example, the customer profile corresponding to the customer may include a home address and a work address for the customer. It may then be determined if the establishment is within a third configurable distance (e.g., predetermined radius, proximity, and/or geofence) about the home address and/or work address stored in association with the customer profile corresponding to the customer. In various embodiments, the first and second consignee location information/data may comprise any pair of forms/sources of consignee location information/data.

If, at step 2314, it is determined that the parameters for providing the location-based alert are satisfied based on the item/shipment location information/data, first consignee location information/data, second (and/or additional) consignee location information/data, then an establishment location-based alert may be generated and provided at step 2316. For example, it may be determined if the customer is within a second configurable distance (e.g., a predetermined proximity of and/or within a predetermined geofence about an establishment) of the establishment based on the first and/or second consignee location information/data. For example, the second configurable distance may be defined by the establishment (e.g., the consignee is within the walls or other boundary that defines the establishment, the establishment parking lot, and/or the like) and/or about the establishment (e.g., within a predetermined distance or area about the establishment). In various embodiments, the second configurable distance may be defined by the range and/or coverage area of one or more sensors in communication with the establishment computing entity 116 and configured to detect the presence of a customer. In various embodiments, additional consignee location information/data may be used to determine if the customer is within the second configurable distance from the establishment (e.g., historical customer location/data and establishment confirmation of the customer's presence at the establishment may both be used). In response to determining that the customer is within the second configurable distance from the establishment, the location-based alert may be generated and provided. In example embodiments, using the first and second consignee location information/data to determine that the customer is within the second configurable distance of the establishment allows for a secure and robust determination that the item may be conveniently and efficiently delivered to the customer at the establishment. For example, an establishment location-based alert may be generated and/or provided by the carrier computing entity 105. In particular, the establishment location-based alert may inform the customer (e.g., via the customer computing entity 110) that an item/shipment for the customer is located near-by and ask if the customer would like to receive delivery of the item/shipment at the establishment in a particular time frame (e.g., in the next five minutes, in the next ten minutes, and/or the like). The establishment location-based alert may provide the customer with a mechanism to request/accept or reject the delivery of the item/shipment at the establishment (e.g., similar to yes and no buttons 2160, 2165).

At step 2318, an indication that the customer would like to take delivery of the item/shipment at the establishment is received. For example, the carrier computing entity 105 may receive an indication that the customer would like to take delivery of the item/shipment at the establishment. For example, a customer may provide input to a user interface (e.g., via the customer computing entity 110) indicating that the customer would like to receive the item/shipment at the establishment. For example, the customer (e.g., operating a customer computing entity 110) may select a button similar to yes button 2160. In various embodiments, the indication that the customer would like to take delivery of the item/shipment must be received within a predetermined time period (e.g., 3 minutes, 5 minutes, 10 minutes of when the establishment location-based alert was provided). In various embodiments, the predetermined time period may be determined based on the time frame indicated in the establishment location-based alert. For example, if the establishment location-based alert indicates that the delivery of the item/shipment at the establishment would take place 10-15 minutes from the time the alert was provided, the predetermined time period for receiving the indication that the customer would like to receive the item/shipment at the establishment may be 8 or 10 minutes from the time the alert was provided. In various embodiments, the predetermined time period may be configured to prevent the delivery vehicle driver to be unnecessarily postponed from performing his or her other delivery and/or pick up stops. In various embodiments, the establishment location-based alert provided to the customer (e.g., via the customer computing entity 110) may include an indication or timer showing the predetermined time period and/or the time remaining in the predetermined time period.

At step 2320, the delivery of the item/shipment at the establishment is completed. For example, a notification is provided to the delivery vehicle driver and/or other carrier personnel (e.g., via a user computing entity 115). For example, the carrier computing entity 105 may receive an indication that the customer would like to receive delivery of the item/shipment at the establishment and in response thereto, the carrier computing entity 105 may generate and/or provide a notification providing the delivery vehicle driver and/or other carrier personnel with the information required to perform the delivery at the establishment. For example, the notification may include a tracking number and/or other identifying information/data for the item, information/data identifying the customer, the establishment, and/or the like. The delivery vehicle driver may take the item/shipment into the establishment, meet the customer, confirm the identity of the customer (e.g., request to see an ID, request a confirmation code that was provided to the customer, and/or the like), and provide the item/shipment to the customer. In some embodiments, the delivery vehicle driver and/or other carrier personnel may be able to turn down the establishment delivery request.

In various embodiments, one or more establishments at a particular strip mall, mall, shopping center, retail district, and/or the like may registered establishments. In such embodiments, a computing entity associated with the strip mall, mall, shopping center, retail district, and/or the like may communicate with the establishment computing entities 116 of the establishments located thereat to determine if a customer is present at any of those establishments. The computing entity associated with the strip mall, mall, shopping center, retail district, and/or the like may then communicate with the carrier to inform the carrier of the presence (or lack thereof) of one or more particular customers.

4. Mobile Shipping Location-Based Alerts

In an example scenario, a customer may wish to ship an item. However, the customer may not aware of convenient locations from which the item may be shipped. For example, the customer may not realize that a carrier drop box or storefront location is located one block away from the customer's usual commuting route. The example embodiments of the present invention provide customers with the information needed to efficiently and conveniently ship an item.

Figure 24:
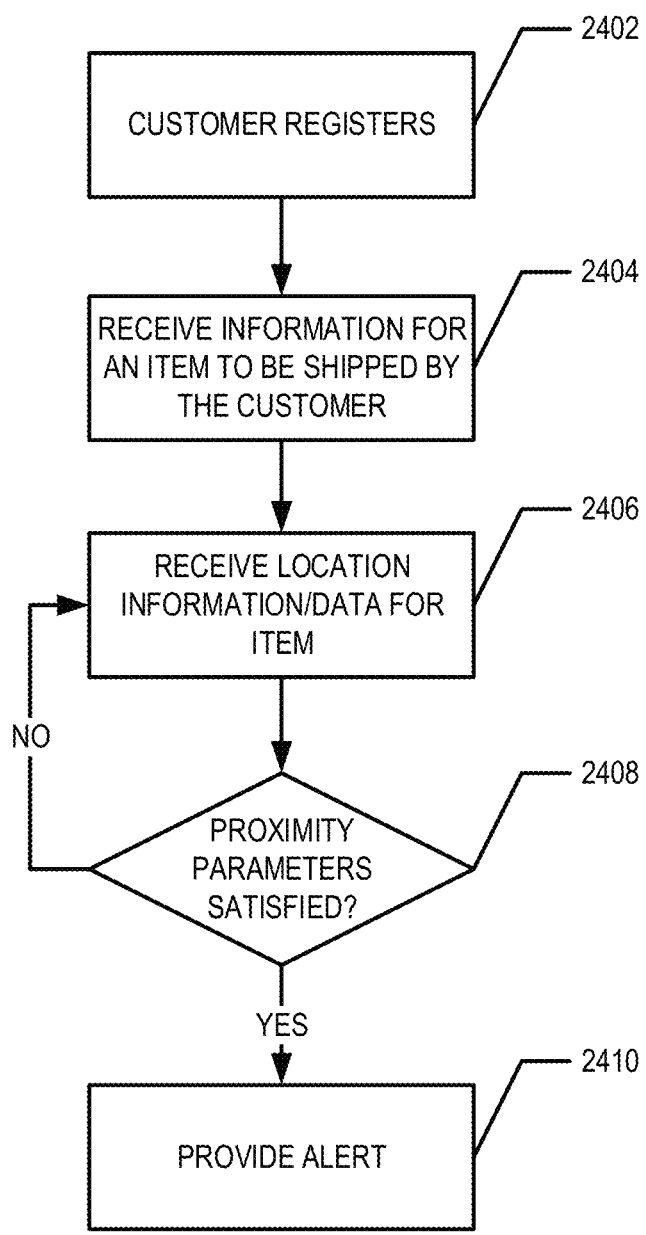

FIG. 24 illustrates a flowchart of processes and procedures that may be used facilitate mobile shipping of an item/shipment by a customer. For example, a mobile shipping location-based alert may inform a customer when they are within a predetermined proximity and/or geofence of a location (e.g., carrier storefront, drop box, and/or the like) or delivery vehicle 100 that may receive an item/shipment the customer would like to ship. Starting at step 2402, the customer registers and/or is registered as describes above. During the registration process, and/or at a later point in time, the customer selects to receive and/or is enrolled to receive mobile shipping location-based alerts. At step 2404, shipping information/data for an item/shipment that the customer is going to ship is received. For example, the carrier computing entity 105 may receive shipping information/data for an item/shipment the customer is going to ship. For example, the customer (e.g., operating a customer computing entity 110) may provide shipping information/data for an item/shipment the customer is going to ship. In various embodiments, the shipping information/data may be received in association with a request for mobile shipping location-based alerts.

At step 2406, item/shipment location information/data for the item/shipment to be shipped by the customer is received. For example, the carrier computing entity 105 may receive item/shipment location information/data for the item/shipment to be shipped by the customer. For example, the item/shipment location information/data may be determined and/or provided by the item/shipment and indicate the current physical location of the item. In another example, the item/shipment location information/data for the item/shipment to be shipped by the customer may be determined and/or provided by the customer computing entity 110 and/or the customer's vehicle 100 and presumed to indicate the current physical location of the item.

At step 2408, it is determined if the parameters for providing the location-based alert are satisfied. For example, a carrier computing entity 105 may determine if the parameters for providing the location-based alert are satisfied. For example, it may be determined if the item/shipment is within a predetermined proximity of and/or within a predetermined geofence about a carrier storefront, an establishment associated with the carrier that may receive items from customers for shipping, a carrier drop box, and/or a delivery vehicle 100 that may take receipt of the item/shipment for shipping.

In various embodiments, determining if the parameters for providing the location-based alert may comprise requesting and/or receiving additional consignee location information/data. For example, the consignee location information/data may be received from the customer's mobile phone and the additional consignee location information/data may then be requested and/or received from the customer's wearable device, vehicle, tablet, and/or other mobile device. In some embodiments, the additional consignee location information/data may be historical consignee location information/data. For example, it may be determined if historical consignee location information/data indicates that the customer has a history of being in the vicinity of the current physical location indicated by the consignee location information/data. In various embodiments, the historical consignee location information/data may be stored by a carrier computing entity 105 and/or requested and/or received from a third party (e.g., a mobile phone service provider). In another example, the additional consignee location information/data may be based on one or more addresses stored in association with the customer profile corresponding to the customer. For example, the customer profile corresponding to the customer may include a home address and a work address for the customer. It may then be determined if the consignee location information/data indicates that the customer is currently located within a predetermined radius, proximity, and/or geofence about the home address and/or work address stored in association with the customer profile corresponding to the customer.

If, at step 2408, it is determined that the parameters for providing a mobile shipping location-based alert are satisfied, or possibly in response thereto, a mobile shipping location-based alert is provided, at step 2410. For example, the carrier computing entity 105 may generate and/or provide a mobile shipping location-based alert. The mobile shipping location-based alert may indicate to the customer that the customer (and/or the item/shipment to be shipped) is near a location from which the item/shipment may be shipped and provide the customer with instructions for getting to the location. If the location is a delivery vehicle 100, the customer may be asked to accept or reject a rendezvous with the delivery vehicle 100 to ship the item/shipment (e.g., the customer computing entity 110 may provide the customer with a mechanism similar to the yes and no buttons 2160, 2165 for accepting or rejecting a rendezvous with the delivery vehicle 100).

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method, performed in a carrier system, for delivering an item to a customer at an alternate delivery location based in part on a real-time location of the customer, the method comprising:
receiving location information for the item, the location information indicating a current physical location of the item;
determining a distance between the item and an entity at a location other than a delivery address of the item, based at least in part on first location coordinates of the current physical location of the item and second location coordinates of a known location of the entity;
determining whether the item is located within a first configurable distance of the entity based at least in part on the distance determined from the first location coordinates and the second location coordinates;
responsive to determining that the item is located within the first configurable distance of the entity, requesting a first determination of a current physical location of the customer and a second determination of the current physical location of the customer;
determining whether the customer is within a second configurable distance of the entity based at least in part on the first determination of the current physical location of the customer and the second determination of the current physical location of the customer;
in response to determining that the customer is within the second configurable distance of the entity, transmitting a notification via a network to a customer computing entity for display via a user interface of an application executing on the customer computing entity, wherein the notification comprises a mechanism via the user interface for the customer to remotely request or reject delivery of the item at the entity; and
responsive to receiving user input via the user interface requesting delivery of the item at the entity, facilitating delivery of the item to the customer at the entity.

2. The method of claim 1 wherein the entity is an establishment.

3. The method of claim 2, wherein the first configurable distance, the second configurable distance, or both is defined (a) by the establishment or (b) about the establishment.

4. The method of claim 2, wherein the first determination of the current physical location of the customer is provided by an establishment computing entity associated with the establishment.

5. The method of claim 4, wherein the establishment comprises a sensor configured to determine if the customer computing entity associated with the customer is present at the establishment and provide an indication of the determination by the sensor to the establishment computing entity.

6. The method of claim 2, further comprising, responsive to receiving user input via the user interface indicating that the customer would like to take delivery of the item at the establishment, providing a notification that the customer would like to take delivery of the item at the establishment to a carrier.

7. The method of claim 1, wherein the location information for the item is determined by the item, a delivery vehicle transporting the item, or a user computing entity associated with a driver of the delivery vehicle that the item is inside of.

8. An apparatus comprising at least one processor and at least one memory including program code, the at least one memory and the program code configured to, with the at least one processor, cause the apparatus to at least:
receive location information for an item, the location information indicating a current physical location of the item;
determine whether the item is located within a first configurable distance of an entity at a location other than a delivery address of the item, based on the location information for the item and the location of the entity within a coordinate system;
responsive to determining that the item is located within the first configurable distance of the entity, request a first determination of a current physical location of a consignee of the item provided by a computing device associated with the consignee and a second determination of the current physical location of the consignee provided by a computing device associated with the entity;
determine whether the consignee is within a second configurable distance of the entity based at least in part on the first determination of the current physical location of the consignee and the second determination of the current physical location of the consignee;
in response to determining that the consignee is within the second configurable distance of the entity, transmit a notification to a user computing entity associated with the consignee for display via a user interface of an application executing on the user computing entity, wherein the notification comprises a mechanism via the user interface for the consignee to remotely request or reject delivery of the item at the entity; and
responsive to receiving user input via the user interface requesting delivery of the item at the entity, facilitate delivery of the item to the consignee at the entity.

9. The apparatus of claim 8, wherein the entity is an establishment.

10. The apparatus of claim 9, wherein the first configurable distance, the second configurable distance, or both is defined (a) by the establishment or (b) about the establishment.

11. The apparatus of claim 9, wherein the first determination of the current physical location of the consignee is provided by an establishment computing entity associated with the establishment.

12. The apparatus of claim 11, wherein the establishment comprises a sensor configured to determine if the user computing entity associated with the consignee is present at the establishment and provide an indication of the determination by the sensor to the establishment computing entity.

13. The apparatus of claim 9, further comprising, responsive to receiving user input via the user interface indicating that the consignee would like to take delivery of the item at the establishment, providing a notification that the consignee would like to take delivery of the item at the establishment to a carrier.

14. A computer program product comprising at least one non-transitory computer-readable storage medium having computer-readable program code portions stored therein, the computer-readable program code portions comprising:
- an executable portion configured to receive location information for an item, the location information indicating a current physical location of the item;
- an executable portion configured to determine whether the item is located within a first configurable distance of an entity at a location other than a delivery address of the item;
- an executable portion configured to, responsive to determining that the item is located within the first configurable distance of the entity,
- request a first determination of a current physical location of a consignee of the item, and
- request a confirmation of the current physical location of the consignee from a different source than the first determination;
- an executable portion configured to determine whether the consignee is within a second configurable distance of the entity based at least in part on the first determination of the current physical location of the consignee and the confirmation of the current physical location of the consignee;
- an executable portion configured to, in response to determining that the consignee is within the second configurable distance of the entity, transmit a notification via a network to a customer computing entity associated with the consignee for display via a user interface of an application executing on the customer computing entity, wherein the notification comprises a mechanism via the user interface for the consignee to remotely request or reject delivery of the item at the entity; and
- an executable portion configured to, responsive to receiving user input via the user interface requesting delivery of the item at the entity, facilitate delivery of the item to the consignee at the entity.

15. The computer program product of claim 14, wherein the entity is an establishment.

16. The computer program product of claim 15, wherein the first configurable distance, the second configurable distance, or both is defined (a) by the establishment or (b) about the establishment.

17. The computer program product of claim 15, wherein the confirmation of the current physical location of the consignee is provided by an establishment computing entity associated with the establishment.

18. The computer program product of claim 17, wherein the establishment comprises a sensor configured to determine if the customer computing entity associated with the consignee is present at the establishment and provide an indication of the determination by the sensor to the establishment computing entity.

19. The computer program product of claim 15, further comprising, responsive to receiving user input via the user interface indicating that the consignee would like to take delivery of the item at the establishment, providing a notification that the consignee would like to take delivery of the item at the establishment to a carrier.

* * * * *

UNITED STATES PATENT AND TRADEMARK OFFICE
CERTIFICATE OF CORRECTION

PATENT NO. : 11,023,846 B2  
APPLICATION NO. : 15/130311  
DATED : June 1, 2021  
INVENTOR(S) : Robert J. Gillen et al.

Page 1 of 1

It is certified that error appears in the above-identified patent and that said Letters Patent is hereby corrected as shown below:

In the Drawings

In sheet 3 of 24, FIG. 3, reference numeral 320, Line 1, delete "COMMUNCATIONS" and insert -- COMMUNICATIONS --, therefor.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*